United States Patent
Suryaputra et al.

(10) Patent No.: US 9,225,417 B2
(45) Date of Patent: *Dec. 29, 2015

(54) MANAGING ALTERNATE SITE SWITCHING IN AN OPTICAL COMMUNICATION SYSTEM

(71) Applicant: RPX Clearinghouse LLC, San Francisco, CA (US)

(72) Inventors: Stephen Suryaputra, Malden, MA (US); Indermohan S. Monga, Lexington, MA (US); Bruce A. Schofield, Tyngsboro, MA (US); Thomas P. Hardjono, Winchester, MA (US)

(73) Assignee: RPX CLEARINGHOUSE LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/195,188

(22) Filed: Mar. 3, 2014

(65) Prior Publication Data

US 2014/0219649 A1 Aug. 7, 2014

Related U.S. Application Data

(63) Continuation of application No. 12/241,539, filed on Sep. 30, 2008, which is a continuation of application No. 09/930,548, filed on Aug. 15, 2001, now Pat. No. 7,738,359.

(60) Provisional application No. 60/225,335, filed on Aug. 15, 2000.

(51) Int. Cl.
| | |
|---|---|
| *H04B 10/038* | (2013.01) |
| *H04L 12/24* | (2006.01) |
| *H04Q 11/00* | (2006.01) |
| *H04L 12/753* | (2013.01) |
| *H04J 14/02* | (2006.01) |

(52) U.S. Cl.
CPC .......... *H04B 10/038* (2013.01); *H04J 14/0238* (2013.01); *H04J 14/0241* (2013.01); *H04L12/24* (2013.01); *H04L 41/00* (2013.01); *H04L 41/046* (2013.01); *H04L 41/32* (2013.01); *H04L 41/5058* (2013.01); *H04Q 11/0062* (2013.01); *H04J 14/0227* (2013.01); *H04J 14/0284* (2013.01); *H04L 41/0893* (2013.01); *H04L 41/5077* (2013.01); *H04L 45/48* (2013.01); *H04Q 11/0071* (2013.01); *H04Q 2011/0079* (2013.01); *H04Q 2011/0081* (2013.01); *H04Q 2011/0088* (2013.01)

(58) Field of Classification Search
CPC ....... H04L 45/48; H04L 41/00; H04L 41/046; H04L 41/32; H04L 41/5058; H04B 10/038; H04Q 11/0062; H04J 14/0238; H04J 14/0241; H04J 14/0227; H04J 14/0284
USPC .................................. 370/216–228, 242–245
See application file for complete search history.

(56) References Cited

U.S. PATENT DOCUMENTS

| | | | | |
|---|---|---|---|---|
| 6,148,410 | A * | 11/2000 | Baskey et al. ................ | 714/4.11 |
| 6,643,254 | B1 * | 11/2003 | Kajitani et al. ............... | 370/217 |
| 7,031,299 | B2 * | 4/2006 | Chaudhuri et al. ........... | 370/352 |

*Primary Examiner* — Christopher Grey
(74) *Attorney, Agent, or Firm* — Anderson Gorecki & Rouille LLP

(57) ABSTRACT

A primary optical path in an optical network is established between first and second edge nodes of the optical network for communication between the first edge node and a primary customer network site coupled to the second edge node. A backup optical path through the optical network from the first edge node to a third edge node of the optical network other than the second edge node is determined for communication between the first edge node and a backup customer network site coupled to the third edge node of the optical network. The backup customer network site is designated to back up the primary customer network site. Communications are forwarded on the primary optical path from the first edge node toward the primary customer network site via the second edge node. Upon detection of a degradation or failure of the primary customer network site, communications are forwarded on the backup optical path from the first edge node toward the backup customer network site via the third edge node.

17 Claims, 32 Drawing Sheets

MANAGING ALTERNATE SITE SWITCHING IN AN OPTICAL COMMUNICATION SYSTEM

CROSS-REFERENCE TO RELATED APPLICATIONS

This application is a continuation of U.S. patent application Ser. No. 12/241,539, filed Sep. 30, 2008, titled SYSTEM, DEVICE, AND METHOD FOR MANAGING ALTERNATE SITE SWITCHING IN AN OPTICAL COMMUNICATION SYSTEM, which is a continuation of U.S. patent application Ser. No. 09/930,548, filed Aug. 15, 2001, titled SYSTEM, DEVICE, AND METHOD FOR MANAGING ALTERNATE SITE SWITCHING IN AN OPTICAL COMMUNICATION SYSTEM, which is now issued as U.S. Pat. No. 7,738,359, which claims priority to U.S. Provisional Patent Application 60/225,335, filed Aug. 15, 2000, now expired.

INCORPORATION BY REFERENCE

The following are incorporated by reference:
U.S. patent application Ser. No. 12/241,539;
U.S. patent application Ser. No. 09/930,548 which is now issued as U.S. Pat. No. 7,738,359;
U.S. Provisional Patent Application 60/225,335;
U.S. patent application Ser. No. 09/931,643 entitled OPTICAL SWITCH ROUTER, now issued as U.S. Pat. No. 7,283,747, which was filed on even date herewith in the names of Bruce A. Schofield, James V. Luciani, and Michael J. Craren;
U.S. patent application Ser. No. 09/930,095 entitled SYSTEM AND DEVICE FOR PROVIDING COMMUNICATION SERVICES IN AN OPTICAL COMMUNICATION SYSTEM, which was filed on even date herewith in the names of Bruce A. Schofield, Indermohan S. Monga, and Stephen Suryaputra;
U.S. patent application Ser. No. 09/930,119 entitled SYSTEM, DEVICE, AND METHOD FOR MANAGING COMMUNICATION SERVICES IN AN OPTICAL COMMUNICATION SYSTEM, filed on even date herewith in the names of Bruce A. Schofield, William R. Hawe, Paul D. Callahan, Indermohan S. Monga, Stephen Suryaputra, and Andre N. Fredette; and
U.S. patent application Ser. No. 09/931,645 entitled SYSTEM, DEVICE, AND METHOD FOR MANAGING CONNECTION ESTABLISHMENT AND RELATED SERVICES IN AN OPTICAL COMMUNICATION SYSTEM, now issued as U.S. Pat. No. 7,321,932, filed on even data herewith in the names of Indermohan S. Monga, Stephen Suryaputra, Vikram Ramachandran, and Bruce A. Schofield.

FIELD OF THE INVENTION

The present invention relates generally to optical networking, and more particularly to managing communication services in an optical communication system.

BACKGROUND OF THE INVENTION

In today's information age, communication networks are increasingly used for transferring information among a multitude of communication devices. As demand for communication services continues to grow, the demand on these communication networks for carrying increasing amounts of information at increasing speeds continues to grow. Therefore, communication networks are evolving to handle these increased demands.

One way in which communication networks are evolving is through the use of optical communication facilities. Optical communication facilities transport information over optical communication media (such as optical fibers). Such optical communication networks provide vast amounts of bandwidth over short and long distances.

The optical communication network is capable of providing various communication services to its users. Traditionally, such communication services have been very expensive, and need to be planned and scheduled well in advance. This is due in part because changes to the optical communication network, such as provisioning and switching optical communication paths, required substantial human intervention.

SUMMARY OF THE INVENTION

In accordance with an aspect a method of operating an optical network comprises: establishing a primary optical path in the optical network between a first edge node of the optical network and a second edge node of the optical network for communication between the first edge node and a primary customer network site coupled to the second edge node; determining a backup optical path through the optical network from the first edge node to a third edge node of the optical network other than the second edge node for communication between the first edge node and a backup customer network site coupled to the third edge node of the optical network, the backup customer network site being designated to back up the primary customer network site; forwarding communications on the primary optical path from the first edge node toward the primary customer network site via the second edge node; and upon detection of a degradation or failure of the primary customer network site, forwarding communications on the backup optical path from the first edge node toward the backup customer network site via the third edge node.

In accordance with one aspect of the invention, an alternate site switching mechanism recovers from failures/degradations that are uncorrected by the core optical communication network. When an uncorrected failure/degradation is detected, communications for a protected end-system are switched from a primary end-system to a backup end-system. The backup end-system may be selected a priori, for example, during connection establishment, in order to reduce switching time once a decision has been made to switch communications from the primary end-system to the backup end-system. Provisions are made for completing the alternate site switching within a specified amount of time. This alternate site switching augments the various protection mechanisms provided by the core optical communication network in order to provide end-to-end protection for the optical communication path.

In accordance with another aspect of the invention, load balancing may be used to further reduce switching time from the primary end-system to the backup end-system. In this case, redundant lightpaths are established from the protected end-system to the primary end-system, and traffic is balanced between the redundant lightpaths. Upon detecting a failure/degradation affecting one of the redundant lightpaths, all traffic is switched to the unaffected lightpath. The alternate site switching mechanism then establishes a backup lightpath in place of the affected lightpath. When the backup lightpath is available, traffic is balanced between the unaffected lightpath and the backup lightpath.

DETAILED DESCRIPTION OF A PREFERRED EMBODIMENT

Figure 1:
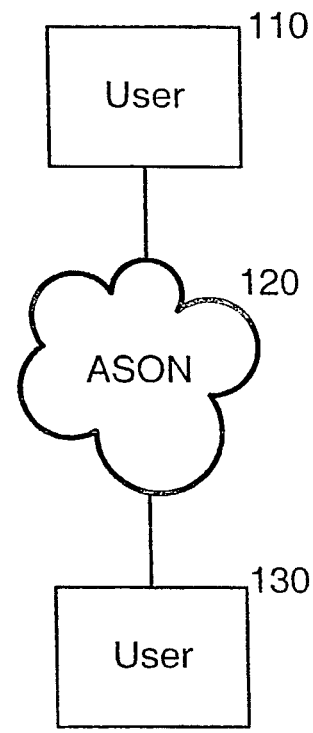
FIG. 1 is a network diagram showing a representation of a communication system in which users communicate over an automatically switched optical network (ASON) in accordance with an embodiment of the present invention.

In a typical embodiment of the present invention, a first user end-system communicates with a second user end-system over a core optical communication network, and, more particularly, over an optical communication path established over the core optical communication network. The core optical communication network provides various services to the user end-system including, among other things, protection for failure/degradation of the optical communication path. Specifically, upon detecting a failure/degradation of the optical communication path, the core optical communication network can take certain steps to recover from the failure/degradation so as to enable the two user end-systems to continue communication. This recovery by the core optical communication network does not involve the user end-systems, and is typically transparent to the user end-systems.

Unfortunately, the protection services provided by the core optical communication network can only recover from certain failures/degradations affecting the optical communication path. Generally speaking, the core optical communication network can recover from failures/degradations within the core optical communication network, but cannot recover from failures/degradations affecting the links to the user end-systems or the user end-systems themselves.

Therefore, in an embodiment of the present invention, an alternate site switching mechanism is used to recover from failures/degradations that are uncorrected by the core optical communication network. Specifically, when an uncorrected failure/degradation is detected, communications for the first (protected) user end-system are switched from the second (primary) user end-system to a third (backup) user end-system. The backup end-system may be selected a priori, for example, during connection establishment, in order to reduce switching time once a decision has been made to switch communications from the primary end-system to the backup end-system. Provisions are made for completing the alternate site switching within a specified amount of time. Load balancing may be used to further reduce switching time from the primary end-system to the backup end-system. This alternate site switching augments the various protection mechanism provided by the core optical communication network in order to provide end-to-end protection for the optical communication path.

In an embodiment of the present invention, intelligent agents operating within the user domain and/or the core optical communication network manage alternate site switching on behalf of the network user. The intelligent agents typically manage such things as designating the backup end-system based upon some predetermined criteria, setting up a failover tree to facilitate switching to the backup end-system, monitoring the optical communication path between the protected end-system and the primary end-system, and switching communications from the primary end-system to the backup end-system upon detecting an uncorrected condition affecting the optical communication path between the protected end-system and the primary end-system.

In a typical embodiment of the present invention, an optical service agent (OSA) manages some or all of the alternate site switching on behalf of the network user. Among other things, the OSA manages communication connections on behalf of the network user. The OSA interacts with the optical communication network to obtain various communication services and manages those communication services for the network user based upon predetermined parameters defined by the network user. In essence, then, the optical communication network provides a "core" set of communication services that can be accessed by the OSA, and the OSA provides advanced communication services for the network user using the "core" set of communication services provided by the optical communication network.

In an agile transport network, various optical communication services that heretofore have been performed manually are performed automatically by "intelligent" optical communication devices within the network. In particular, the optical internet infrastructure is evolving from a statically-provisioned SONET ring-based transport network to a more dynamically-provisioned mesh network.

One example of and agile transport network is an automatically switched optical/transport network (ASON or ASTN), which is described in the related application entitled SYSTEM AND DEVICE FOR PROVIDING COMMUNICATION SERVICES IN AN OPTICAL COMMUNICATION SYSTEM incorporated by reference above. The ASON typically includes optical cross-connect switches (OXCs) that are used to form the mesh network and optical channel controllers (OCCs) that dynamically create, delete, and modify optical communication paths by controlling the OXCs through a connection control interface (CCI). For convenience, the OXCs and OCCs are referred to hereinafter collectively as ASON devices. The ASON devices, and in particular the OCCs, are typically network routers that use a link-state routing protocol (e.g., OSPF) to distribute link attributes (such as optical channel availability) and a signaling protocol (e.g., MPLS or GMPLS) to manage optical communication paths end-to-end. These protocols enable the ASON to automatically and quickly create, delete, and modify optical communication paths. The ASON typically also includes an optical service server (OSS) for coordinating the various communication services provided by the ASON. Thus, the ASON provides more agility by moving from manual provisioning to automatic provisioning via switching and signaling.

In essence, then, the ASON is an optical/transport network that has dynamic connection capabilities. Among other things, the ASON provides for discovery of physical topology for optical elements, efficient use of available bandwidth by dynamic action of optical communication paths, and end-to-end connection protection and restoration.

FIG. 1 shows a representation of a communication system 100 in which two users 110, 130 communicate over an ASON 120. The users 110, 130 may be optical switch routers, as described in the related application entitled OPTICAL SWITCH ROUTER incorporated by reference above, that are positioned as edge nodes of their respective user networks for interfacing with the ASON 120. The ASON 120 provides various communication services to the users 110, 130 via the automatic servicing logic. Various ASON communication services are discussed in more detail below.

Each ASON device includes an ASON controller for supporting automated communication services within the ASON 120. Among other things, the ASON controller enables each ASON device to automatically provision, switch, and signal optical communication paths with the ASON 120. The ASON controller enables carriers and service providers to offer many value-added services to their customers.

In order for the users 110, 130 to control and monitor communication services from the ASON 120, the ASON controller provides a user-to-network interface (UNI) through which the users 110, 130 interact with the ASON controller for controlling and monitoring communication services within the ASON 120. Through the ASON UNI, the users 110, 130 can access various controllable features of the ASON 120. For example, using the ASON UNI, the users 110, 130 can request an optical communication path having certain attributes, renegotiate the attributes of the optical communication path, control switching of the optical communication path, terminate the optical communication path, and monitor operation of the ASON 120, to name but a few.

Within the ASON 120, each ASON device is able to perform various functions in support of the automated communication services. Some of these functions can be carried out by an individual ASON device, while others of these functions require coordination among multiple ASON devices. Therefore, the ASON controller provides a network-to-network interface (NNI) that enables communication between ASON devices for coordination various communication functions. Through the ASON NNI, the various ASON devices can exchange ASON routing information and coordinate such things as establishment and termination of optical communication paths switching of optical communication paths, and protection and restoration of optical communication paths, to name a few.

Figure 2:
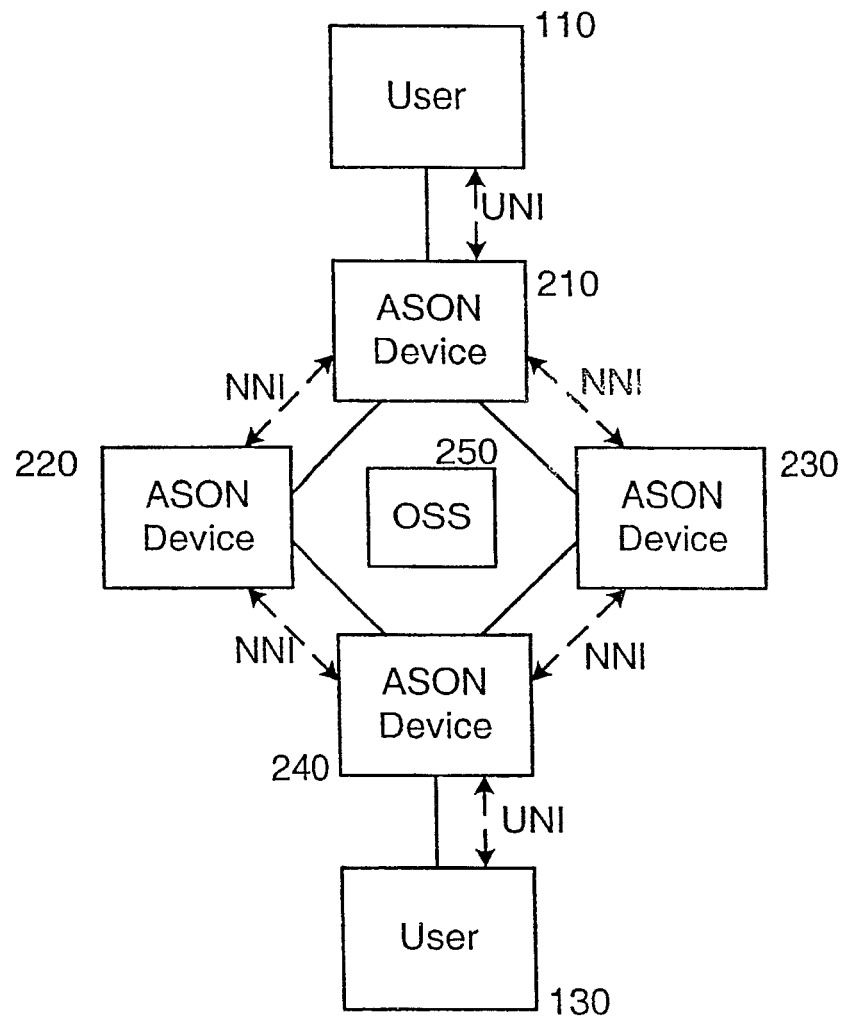
FIG. 2 is a network diagram showing an exemplary ASON in accordance with an embodiment of the present invention.

FIG. 2 shows an exemplary embodiment of the ASON 120 having four ASON devices 210, 220, 230,240 rod OSS 250. For convenience, the solid lines shown between the ASON devices 210-240 represent optical communication paths, which may be all-optical paths (lightpaths) or partially optical paths (switch-paths), and the dashed lines shown between the ASON devices 210-240 show the type of interface (UNI or NNI). The users 110, 130 interface with the ASON 120 through ASON device 210 and ASON device 240, respectively. The ASON devices 210, 240 provide a UNI to the users 110, 130, respectively, through which the users 110, 130 can control and monitor communication services provided by the ASON 120, and more specifically by the ASON controller within the ASON devices 210-240. The ASON devices 210-240 are interconnected via the NNI, and use the NNI to interoperate for coordinating various communication function. It should be noted that the ASON NNI may utilize separate communication paths from the optical communication paths. The OSS 250 coordinate the various communication services provided by the ASON devices 210-240.

At the heart of the various automated communication services is automated switching of optical communication paths. In order to support automatic switching of optical communication paths within the ASON 120, the ASON devices 210-240 typically include some form of optical switching logic, such as an optical/photonic switching fabric, for performing optical/photonic switching of optical communication paths. The optical switching fabric may be based upon any of a variety of optical/photonic switching technologies, including, but not limited to, Micro Electro Mechanical System (MEMS) technology, Micro Opto Electro Mechanical System (MOEMS) technology, lithium niobate technology, liquid crystal technology, or other optical/photonic switching technology. The optical switching logic can be dynamically configured under control of the ASON controller for such things as passing optical data streams from a number of incoming optical fibers to a number of outgoing optical fibers (i.e., switching), adding an optical data stream to an outgoing optical fiber, and dropping an optical data stream from an incoming optical fiber for local processing by the ASON device, to name but a few.

Figure 3:
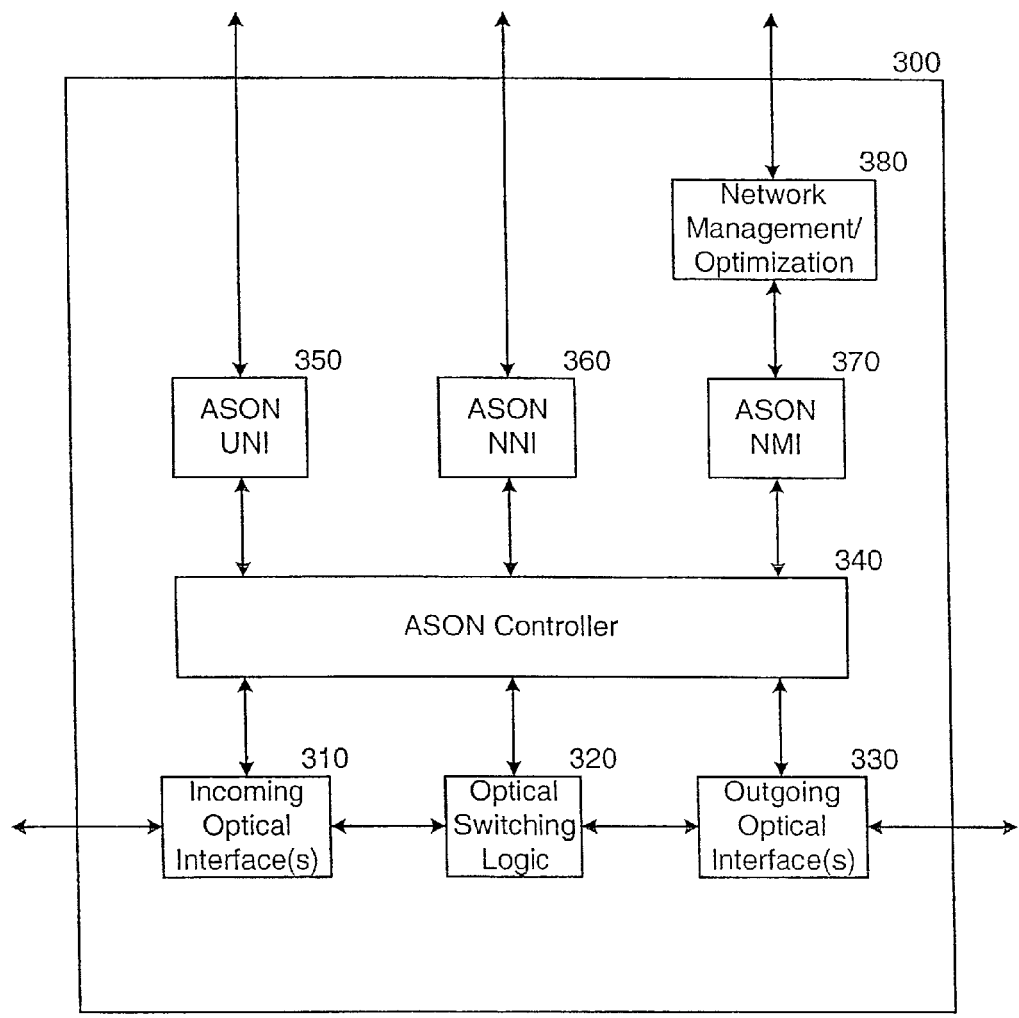
FIG. 3 is a block diagram showing relevant components of an exemplary ASON device in accordance with an embodiment of the present invention.

FIG. 3 shows the relevant components of an exemplary ASON device 300. Among other things, the ASON device 300 includes a number of incoming optical interfaces 310, a number of outgoing optical interfaces 330, optical switching logic 320, ASON controller 340, ASON UNI 350, ASON NNI 360, ASON Network Management Interface (NMI) 370, and network management/optimization elements 380. The incoming optical interface(s) 310 are couplable to a number or incoming optical fibers for receiving optical data streams at various wavelengths. That outgoing optical interface(s) 330 are couplable to a number of outgoing optical fibers for outputting optical data streams at various wavelengths. The optical switching logic 330 is interposed between the incoming optical interface(s) 310 and the outgoing optical interface(s) 330 for switching optical data streams, which may include such things as passing certain optical data streams received over the incoming optical interface(s) 310 through to the outgoing optical interface(s) 330, dropping one or more optical data streams received over the incoming optical interface(s) 310 for local processing by the ASON device 300, and adding one or more optical streams to the outgoing optical interface(s) 330, to name but a few. The ASON controller 340 automates certain communication services by controlling among other things, the incoming optical interface(s) 310, the optical switching logic 320, and the outgoing optical interface(s) 330. The ASON UNI 350 enables a user to control and monitor communication services provided by the ASON controller 340. The ASON NNI 360 enables the ASON controller 340 within the ASON device 300 to interact with the ASON controller in other ASON devices for coordinating communication services within the ASON 120. The ASON UNI 350 and the ASON NNI 360 are typically integral to the ASON controller 340, but are shown here separately for convenience. The ASON NMI 370 is a network management interface between the ASON controller 340, and various network management/optimization elements 380. Among other things, the ASON controller 310 provides network status information to the network management/optimization elements 380 and receives network update from the network management/optimization elements 380 via the ASON NMI 370.

Without limitation, the ASON 120 can provide practically any communication service that has traditionally been performed manually. As described in the related application entitled SYSTEM AND DEVICE FOR PROVIDING COMMUNICATION SERVICES IN AN OPTICAL COMMUNICATION SYSTEM incorporated by reference above, some exemplary communication services that can be provided by the ASON 120 include "plug and play" for optical elements, modeling of optical communication paths, automatic provisioning of optical communication paths, user-requested switching of optical communication paths, automatic switching based upon service level agreement (SLA), automatic switching for protection and restoration, bandwidth management, and reporting of statistical and other information, to name but a few. It should be noted that the present invention is in no way limited to any particular communication service provided by the ASON 120.

As disclosed above, the ASON UNI enables the users to control and monitor communication services provided by the ASON 120. The ASON UNI provides a standardized interface to the ASON 120, and more particularly to the ASON controller 340 in the ASON device. Conceptually, the ASON UNI provides a set of "control knobs" through which the users can control and monitor ASON communication services.

One way for a user to access ASON communication services is by implementing some or all of the ASON UNI functionality. For example, ASON UNI functionality can be integrated with a user application so that the user application can access ASON communication services. For convenience, such a user is referred to hereinafter as an ASON-enabled user, and such a user application is referred to hereinafter as an ASON-enabled user application.

Figure 4:
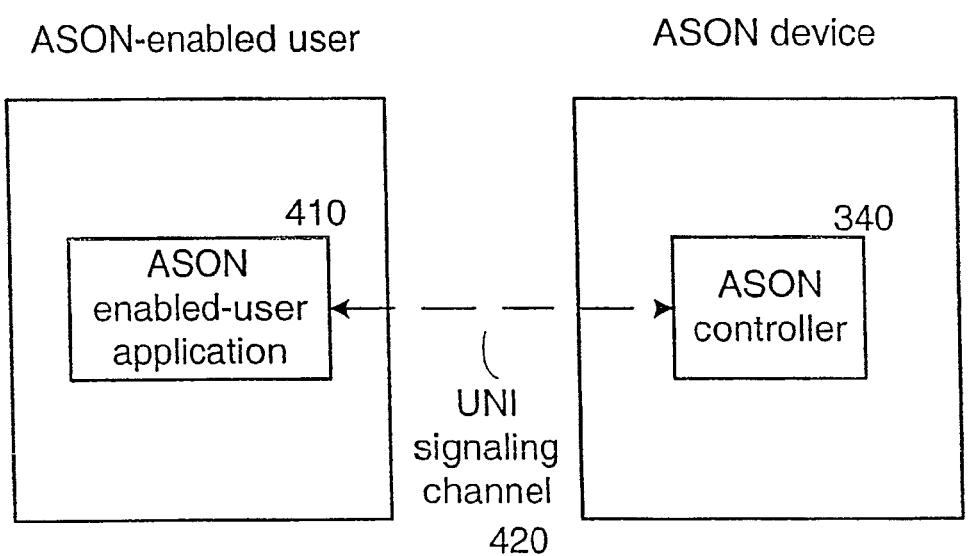
FIG. 4 is a block diagram showing an ASON-enabled user including an ASON-enabled user application in accordance with an embodiment of the present invention.

FIG. 4 shows an ASON-enabled user including an ASON-enabled user application 410. The ASON-enabled user application 410 implements some of all of the ASON UNI functionality. The ASON-enabled user application 410 communicates with the ASON controller 340 in the ASON device over a UNI signaling channel 430, using the ASON UNI in order to obtain communication services from the ASON 120. The UNI signaling channel 420 may be, for example, an in-band signal carried over a SONET Data Communication Channel (DCC).

Figure 5:
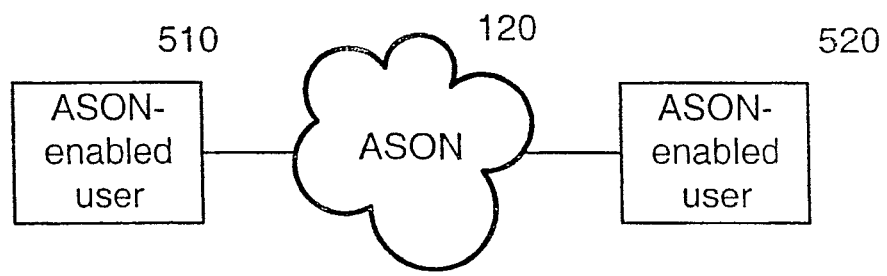
FIG. 5 is a network diagram showing an exemplary communication system in which ASON-enabled users communicate over an ASON in accordance with an embodiment of the present invention.

FIG. 5 shows an exemplary communication system 500 in which two ASON-enabled users 510,520 communicate over the ASON 120. Each of the ASON-enabled users 510,520 implement some or all of the ASON UNI, and therefore are able to monitor and control certain communication services provided by the ASON 120. For example, using the ASON UNI, the ASON-enabled users 510, 520 can establish an end-to-end optical communication path for communicating over the ASON 120. The optical communication path has certain attributes that are negotiated between the two ASON-enabled users 510, 520 and also between the ASON-enabled users 510, 520 and the ASON 120.

Unfortunately, it is not always practical to implement the ASON UNI in each user application that requires ASON communication services. Therefore, another way for the user to access ASON communication services is by employing an optical service agent (OSA) to manage communication service for the user. As described in the related application entitled SYSTEM, DEVICE, AND METHOD FOR MANAGING COMMUNICATION SERVICES IN AN OPTICAL COMMUNICATION SYSTEM incorporated by reference above, the OSA is an intelligent, embedded signaling agent that cerates within the user at the edge of the ASON 120. The OSA implements application-specific services and intelligence as well as the ASON UNI and other mechanisms for communicating with the ASON controller 340 via the ASON UNI. The OSA can be viewed as a subsystem that understands user requirements and manages various communication services on behalf of the user to meet the user requirements. Specifically, the OSA interacts with the ASON 120 via the ASON UNI to obtain various communication services and manages that communication services for the user based upon predetermined parameters defined by the user. Architecturally, the OSA is layered above the ASON UNI, and uses the ASON UNI to manage and control ASON communication services provided through the ASON controller 340. In essence, then, the OSA provides advanced communication services for the user using the "control knobs" provided by the ASON UNI. For convenience, a user that employs an OSA for managing communication services if referred to hereinafter as an OSA-enabled user.

Figure 6:
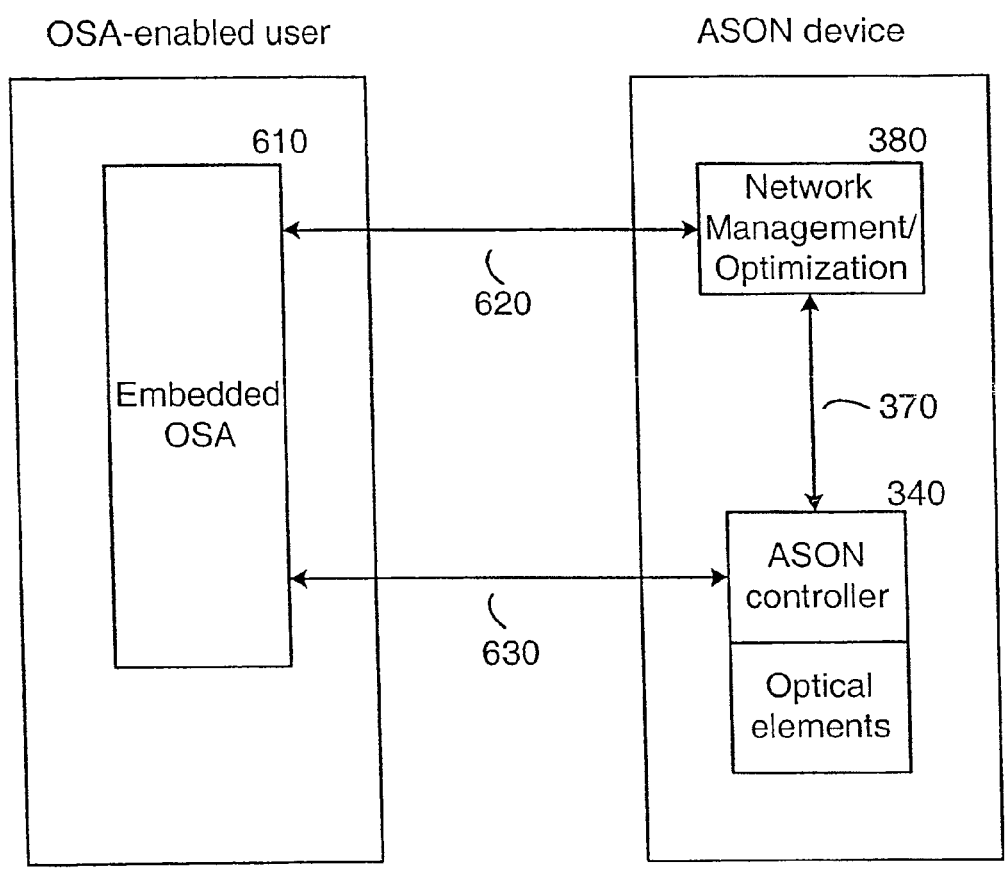
FIG. 6 is a block diagram showing an OSA-enabled user including an embedded OSA in accordance with an embodiment of the present invention.

FIG. 6 shows an OSA-enabled user including an embedded OSA 610. The OSA 610 implements application-specific services and intelligence as well as the ASON UNI and other mechanisms for communicating with the ASON controller 340 via the ASON UNI. The OSA 610 communicates with network management/optimization elements 380 in the ASON 120 via a network management interface 620, and communicates with the ASON controller 340 in the ASON device via the ASON UNI 630 in order to obtain communication services from the ASON 120, specifically by sending service requests to the ASON controller 340 and receiving service responses from the ASON controller 340. The OSA 610 manages the communication services for the user based upon predetermined parameters defined by the user. The ASON controller 340 provides network status information to the network management/optimization elements 380 and receives network updates from the network management/optimization elements 380 via the ASON NMI 370.

The OSA 610 is typically implemented in software, and can be implemented in a platform dependent or platform independent manner. In a platform dependent OSA implementation, the OSA 610 is implemented specifically for a particular platform, and is typically not portable to other platforms. In a platform independent OSA implementation, the OSA 610 is implemented so as to work with multiple platforms, for example, by separating platform-specific functions from the higher level protocols and algorithms and implementing the platform-specific functions separately from the higher level protocols and algorithms such that the higher level protocol/algorithm "layer" can be used with the platform-specific "layer" for a particular platform. The suitability of a particular programming language for implementing the OSA 610 may depend on the type of implementation (platform dependent or platform independent) as well as the execution frequency of the OSA 610. For example, a Java implementation may be suitable for a platform independent implementation in which the OSA 610 is executed infrequently, while a C++ implementation may be more suitable for platform dependent implementations as well as applications in which the OSA 610 is executed more frequently.

Whether the OSA 610 is implemented in a platform dependent or platform independent manner, the OSA 810 typically includes various user-controllable and user-customizable features. In order for a user application to access these user-controllable and user-customizable features, the OSA 610 typically includes an OSA Application Program Interface (API) that includes various primitives for accessing the user-controllable and user-customizable features of the OSA 610. The OSA API is typically simpler than the ASON UNI, particularly because the OSA API is typically an internal software interface that does not need to implement the complexities of the ASON UNI (such as mechanisms for communicating over a UNI signaling channel).

Figure 7:
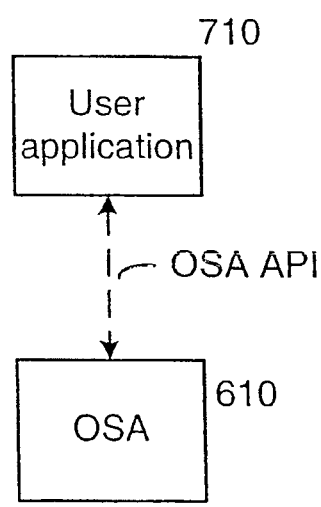
FIG. 7 is a diagram showing the relationship between a user application and the OSA in accordance with an embodiment of the present invention.

FIG. 7 shows the relationship between a user application 710 and the OSA 610. The OSA 610 provides an OSA API through which the user application 710 can access the OSA 610. The OSA API includes various primitives for accessing the user-controllable and user-customizable features of the OSA 610.

In a typical embodiment of the OSA 610, the OSA 610 is separated into two components, namely an application component (referred to hereinafter as the OSA-A) and a network component (referred to hereinafter as the OSA-N). The OSA-A and the OSA-N communication via a control interface, which, depending on the placement of the OSA-N (discussed below), may be the ASON UNI or another control interface.

The OSA-A is the application piece of the OSA 610. The OSA-A implements application-specific services and intelligence. Because the OSA-A is so tightly coupled to the user application, the OSA-A typically resides on the user platform in the edge system. The OSA-A manages communication services on behalf of the user, specifically by requesting communication services from the ASON 120 via the OSA-N and mapping communication services from the ASON 120 to the user network or application.

The OSA-N is the network piece of the OSA 610. Among other things, the OSA-N provider functionality for user authentication, registration, and membership. Authentication functionality enables the network to authenticate the user in order to ensure that the user is permitted to access ASON communication services. Registration functionality enables the user to register a user identifier with the network. For example, in an Internet Service Provider (ISP) application, the user identifier is typically the address of the router attachment to the ASON device (i.e., the IP address of the ASON controller and the UNI control channel identifier), which can be viewed as the L1/L2 address of the router interface. Membership functionality enables the user to join a multicast group along with other peer users of the ASON 120. The OSA-N may reside on the platform in the edge system or in the ASON device at the edge of the ASON 120.

Figure 8:
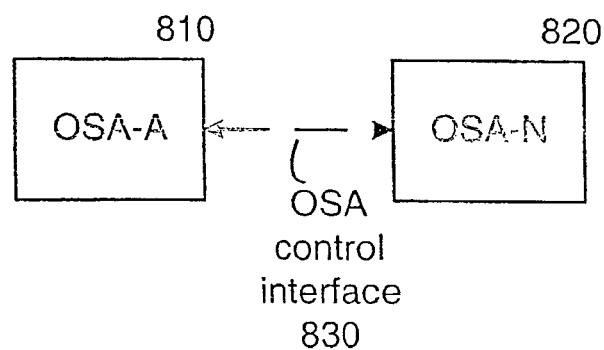
FIG. 8 is a diagram showing the relationship between the OSA-A and the OSA-N in accordance with an embodiment of the present invention.

FIG. 8 shows the relationship between the OSA-A 810 and the OSA-N 820. The OSA-A implements application-specific services and intelligence for managing communication services on behalf of the user. The OSA-N provides functionality for user authentication, registration, and membership. The OSA-A and the OSA-N communicate via the OSA control interface 830.

Figure 9:
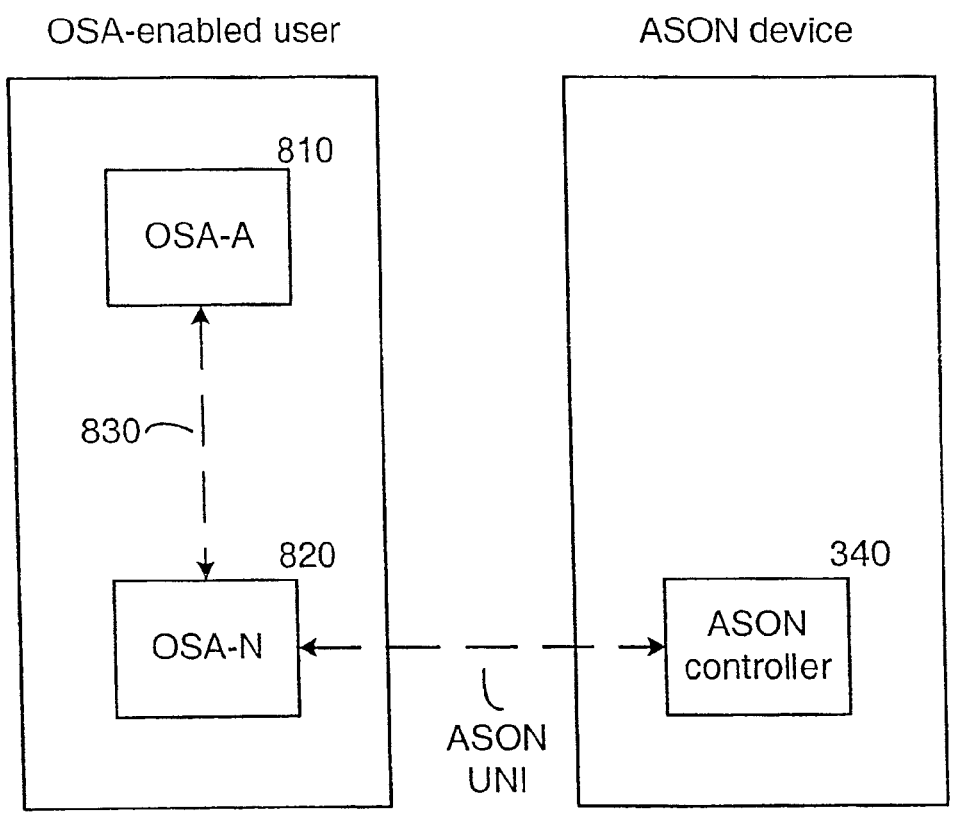
FIG. 9 is a diagram showing an exemplary system in which the OSA-N resides in the OSA-enabled user in the edge system in accordance with an embodiment of the present invention.

FIG. 9 shows an exemplary system in which the OSA-N 820 resides in the OSA-enabled user in the edge system. Specifically, the OSA-enabled user includes both the OSA-A 810 and the OSA-N 820. The OSA-A 810 and the OSA-N 820 communicate via the OSA control interface 830. In this case, the OSA control interface 830 is typically a software interface between the OSA-A 810 and OSA-N 820 components. The OSA-A 810 implements application-specific services and intelligence. The OSA-N 820 provides functionality for user authentication, registration, and membership, and implements the ASON UNI and other mechanisms for communicating with the ASON controller 340 in the ASON device. In this configuration, the OSA-N 820 can be implemented as a device driver for the specific UNI signaling channel interface between the OSA-enabled user and the ASON device. The OSA-A 810 can be used over different types of UNI signaling channels, fro example, by installing an appropriate OSA-N device driver that supports the UNI signaling channel for a particular application.

Figure 10:
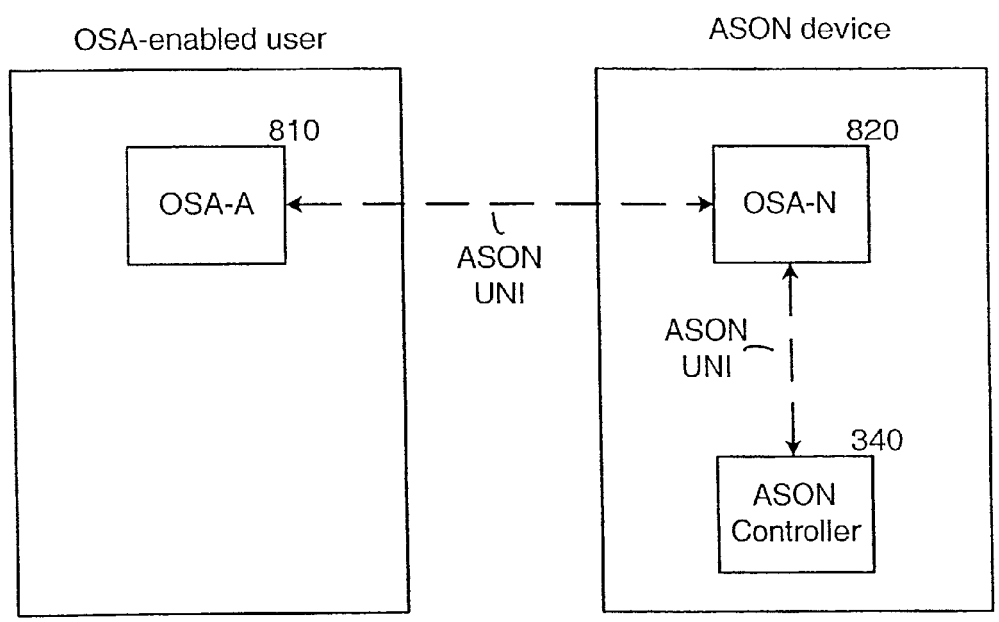
FIG. 10 is a diagram showing an exemplary system in which the OSA-N resides in the ASON user at the edge of the ASON in accordance with an embodiment of the present invention.

FIG. 10 shows an exemplary system in which the OSA-N 820 resides in the ASON user at the edge of the ASON 120. Specifically, the ASON device includes the OSA-N 820 and the ASON controller 340, The OSA-A 810 in the OSA-enabled user communicates with the OSA-N 820 in the ASON device via the ASON UNI. With the OSA-N 820 resident in the ASON device, the ASON device (i.e., the service provider) can provide advanced communication services to the OSA-enabled user that are controlled through the OSA-A 810.

Figure 11:
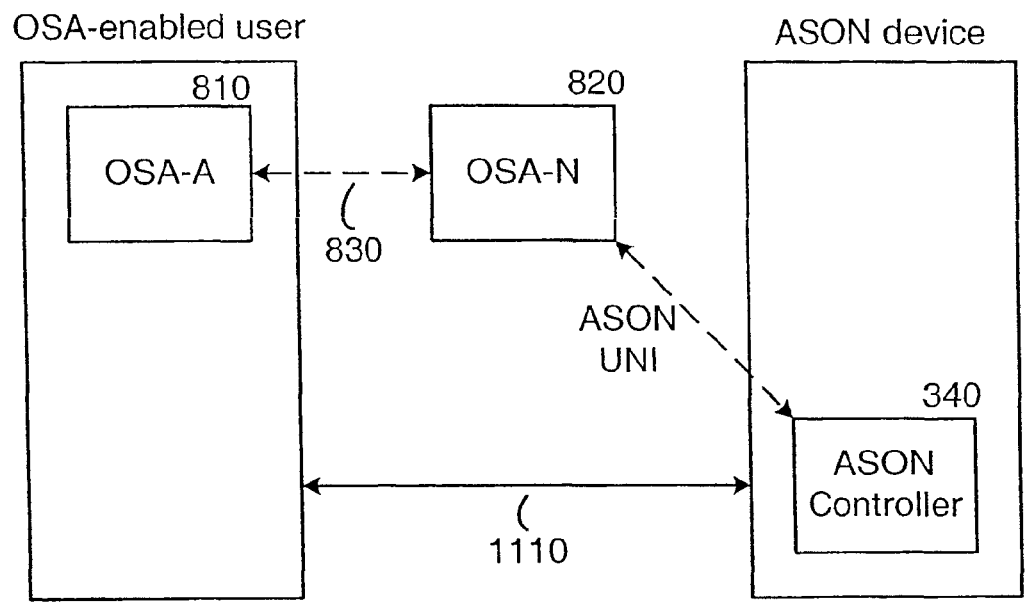
FIG. 11 is a diagram showing an exemplary system in which the OSA-N resides outside of the OSA-enabled user and the ASON device in a proxy arrangement in accordance with an embodiment of the present invention.

FIG. 11 shows an exemplary system in which the OSA-N 820 resides outside of both the OSA-enabled user and the ASON device in a proxy arrangement. In this proxy arrangement, the OSA-enabled user is not required to support the ASON UNI signaling channel over the bearer channel 1110. Instead, a separate control channel 830 can be established for communication between the OSA-A 810 in the OSA-enabled user and the OSA-N 820. The OSA-A 810 sends requests to the OSA-N 820 for ASON services, and the OSA-N 820 carries pit the requests using the ASON UNI. Such a proxy-based OSA/UNI can be useful in extending ASON services to legacy optical edge equipment.

In order to guarantee service to its users and maintain integrity of the optical core, the ASON 120 needs to provide a level of security and authentication. The fact that there is an enabled physical connection between an ASON-enabled user and the ASON device may be sufficient authentication for the ASON-enabled user to access the ASON 120. However, as ASON usage grows and OSA is deployed, the ASON 120 will need to authenticate the OSA-enabled users so that only authorized OSA-enabled users are able to access the ASON 120. Therefore, the ASON 120 will authenticate each OSA-enabled user that registers with the ASON controller.

In one embodiment an authentication server is used to authenticate OSA-enabled users. The authentication server is typically a centralized database that uses an authentication protocol for authentication. The authentication protocol can use any of a variety of authentication techniques, such as challenge-based handshake authentication or simple username/password based authentication.

In another embodiment, each ASON controller 340 uses public key technology (i.e., authentication certificates) to authenticate OSA-enabled users that register with it. This requires that the OSA understand and manage authentication certificates for the OSA-enabled user.

Data security is a user-based feature that needs to be implemented at the edge of the enterprise network. The OSA software need not support data integrity.

Architecturally, the OSA-N functionality can be implemented in different ways. The suitability of a particular OSA-N architecture depends on a number of characteristics, such as such as implementation complexity, fault tolerance, UNI bandwidth utilization, UNI signaling delay, memory utilization, and computational complexity. Because OSA-N is layered on top of the ASON UNI, an important consideration is the UNI bandwidth utilization and signaling delay for OSA signaling. Latency is important because it affects the type of applications OSA can support.

A number of exemplary OSA-N architectures, namely a client-server architecture, a distributed flooding architecture, a hybrid/proxy architecture, and an ASON-coupled architecture, are discussed herein. It should be noted, however, that the present invention is in no way limited to any of the described OSA-N implementations or to any particular OSA-N implementations.

Figure 12:
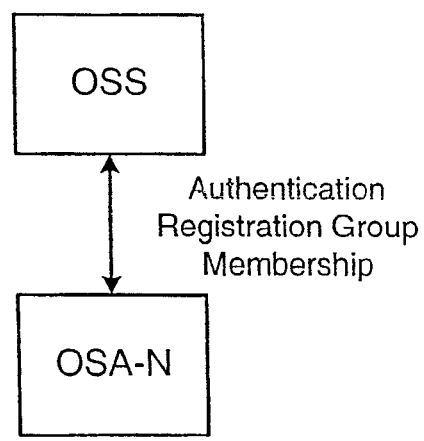
FIG. 12 is a diagram depicting how OSA-N functionality is handled by the OSS in accordance with a client-server embodiment of the present invention.

In the client-server architecture, most of the OSA-N functionality, including authentication, registration and group membership, is handled by an optical service server (OSS), as shown in FIG. 12. The OSS maintains authentication, registration, and group membership information for multiple OSA-enabled devices. The OSA-enabled user is typically pre-configured with a group identifier. When the OSA-enabled user is attached to the ASON 120, the OSA-N sends a registration message to OSS. The OSA-N includes its group identifier in the registration message. The OSS stores the group identifier in its registration database. The OSA-N queries the OSS to obtain group membership information that includes the identity and location of peer users.

Figure 13:
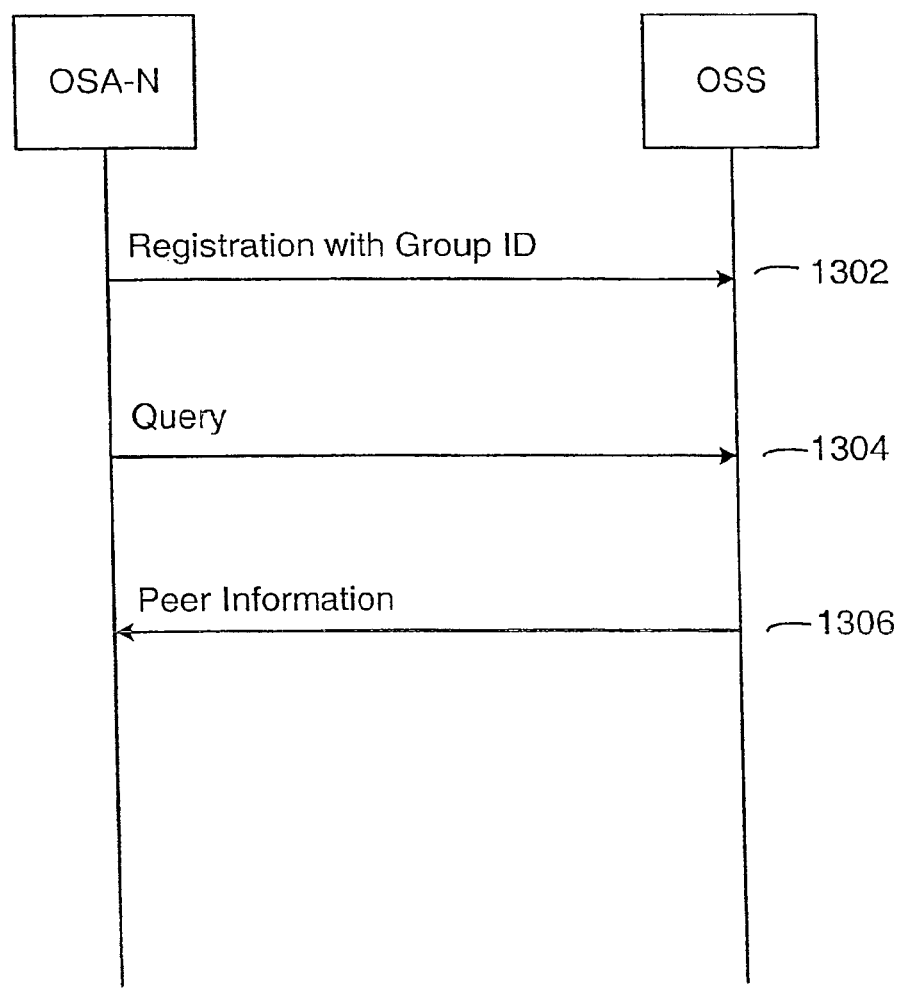
FIG. 13 is a message flow diagram depicting various exchanges between the OSA-N and the OSS in accordance with a client server embodiment of the present invention.

FIG. 13 is a message flow diagram depicting various exchanges between the OSA-N and the OSS in the client-server architecture. The OSA-N sends a registration message 1302 to the OSS including the group identifier (ID) for the OSA-enabled user. The OSS stores the group identifier in its registration database. The OSA-N then sends a query message 1304 to the OSS to obtain group membership information that includes the identity and location of peer users. The OSS sends peer information 1306 to the OSA-N in response to the query 1304.

The client-server architecture has a number of characteristics that are considered to be advantages. First, the client-server architecture is relatively simple to implement. Second, the amount of signaling bandwidth (both UNI and NNI) is relatively small, in part because group membership information is maintained and distributed by the OSS and therefore there is no need to advertise group membership information to the network. Signing bandwidth can be further reduced by having the OSA-N cache the group membership information it retrieves from the OSS, with a periodic refresh technique used to keep the cache current.

The client-server architecture has a number of characteristics that are considered to be disadvantages. First, the OSS represents a single point of failure so that, if the OSS fails, the network cannot perform authentication, registration, and group membership functions. This problem can be mitigated by running a "backup" OSS and using a synchronization protocol, such as the Server Cache Synchronization Protocol (SCSP) as described in RFC 2334, to maintain synchronization between the servers, although this adds implementational complexity. Second, because the client-server architecture is server-based, the network is heavily dependent upon the availability, reliability, and performance of the OSS, which could become a bottleneck for overall system performance, specifically in terms of delay. Third, like other types of centralized solutions, the client-server architecture is not scalable. Fourth, in order to register with the OSS, the OSA-enabled user must be manually configured with its group identifier.

Figure 14:
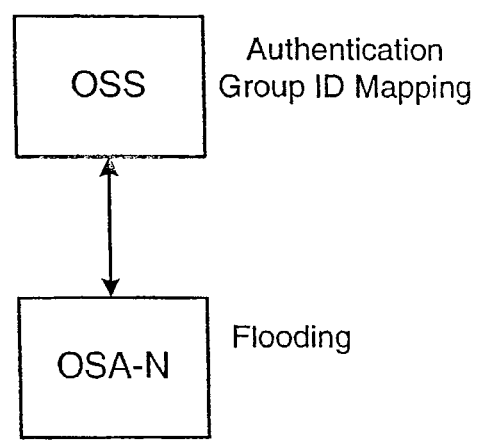
FIG. 14 is a diagram depicting how authentication is handles by the OSA in accordance with a distributed flooding embodiment of the present invention.

In the distributed flooding architecture, authentication is handled by the OSS, as shown in FIG. 14. The OSS maintains authentication information for multiple OSA-enabled users, and also maintains a group identifier for each OSA-enabled user. After authenticating an OSA-enabled user, the OSS informs the OSA-enabled user of its group identifier. The OSA-enabled user then informs the other OSA-enabled users in the network of its group membership, specifically by flooding an advertisement through the network, for example, in a manner similar to OSPF-TE and PNNI Augmented Routing. This flooding occurs periodically and, since the procedure is similar to that of OSPF and PNNI, inherits the advantages of both protocols. The link state advertisement (LSA) and neighbor database is maintained in the user domain rather than in the network domain.

Figure 15:
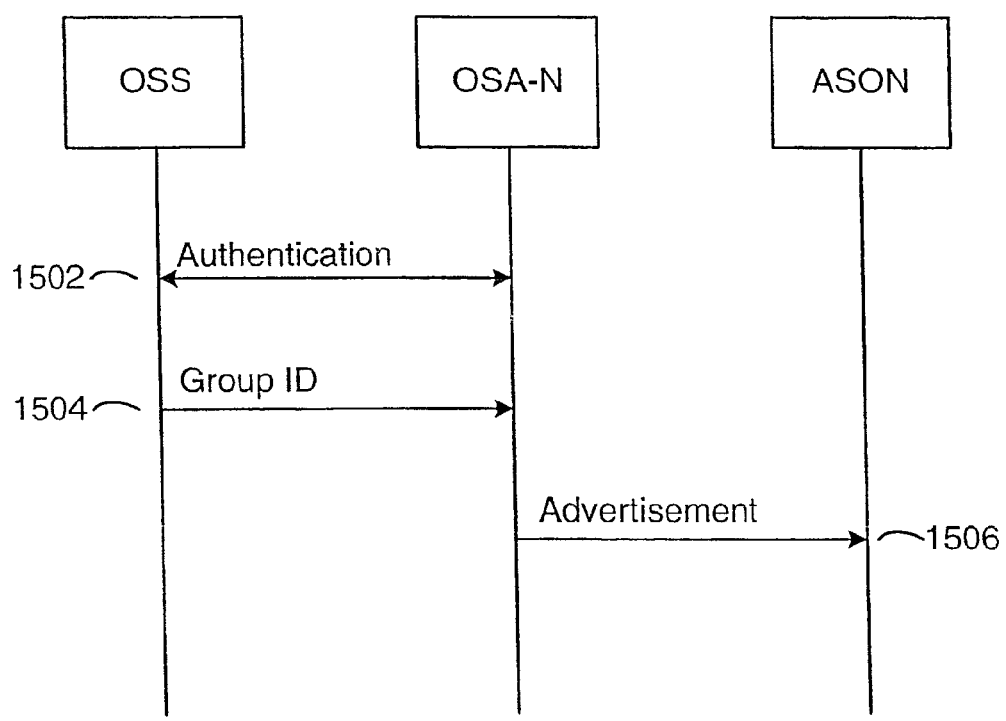
FIG. 15 is a message flow diagram depicting various exchanges between the OSA-N and the OSS in accordance with a distributed flooding embodiment of the present invention.

FIG. 15 is a message flow diagram depicting various exchanges between the OSA-N and the OSS in the distributed flooding architecture. The OSS authenticates the OSA-N through a number of exchanges 1502. After authenticating the OSA-N, the OSS determines the group identifier (ID) for the OSA-enabled user, and sends a group identifier (ID) 1504 to the OSA-N. The OSA-N sends an advertisement message 1506 into the ASON. The advertisement message 1506 is flooded throughout the network.

The distributed flooding architecture has a number of characteristics that are considered to be advantages of the distributed flooding architecture. First, it allows centralized policy as to which OSA-enabled users can join a group. Second, it does not require manual configuration of the group identifier, and instead uses the OSS to distribute the group identifier after authentication of the OSA-enabled user. Third, it is well-suited to IP-router end systems, since OSPF is an extensible IP protocol by virtue of Opaque Link State Advertisements (LSA).

The distributed flooding architecture has a number of characteristics that are considered to be disadvantages of the distributed flooding architecture. First, if the OSS is out of service, then the OSA-enabled user will not be able to authenticate and determine its group identifier, and so the OSA-enabled user will not be able to determine its peers automatically. This problem can be mitigated by providing peer information the OSA-enabled user manually, which would allow connections to be made using the ASON. In this respect, the distributed flooding architecture advantageously separates optical network operation from the availability of the OSS and allows the OSA to own most of the intelligence. Second, the flooding mechanism uses extra bandwidth in the ASON signaling network (both UNI and NNI), which can be particularly problematic if the UNI has limited bandwidth. Third, flooding does not occur until authentication is complete. Fourth, an OSPF-based flooding mechanism required IP support and is therefore not suitable for non-IP routers. Fifth, because the LSA and neighbor database is maintained in the user domain rather than the network domain, topological information, must be "leaked" to the OSA-enabled user, which can be done by implementing some form of NNI in the UNI and thereby confusing the separation between the NNI and the UNI.

Figure 16:
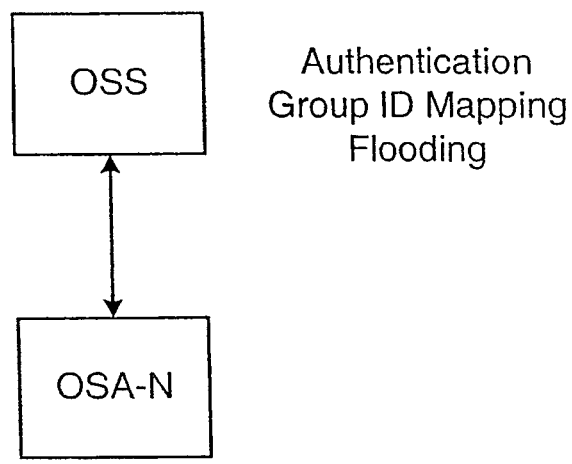
FIG. 16 is a diagram depicting how authentication and flooding are handled by the OSS in accordance with a hybrid/proxy embodiment of the present invention.

In the hybrid/proxy architecture, authentication and flooding are handled by the OSS, as shown in FIG. 16. The OSS maintains authentication information for multiple OSA-enabled users, and also maintains a group identifier for each OSA-enabled user. After authenticating an OSA-enabled user, the OSS floods the advertisement on behalf of the OSA-enabled user, for example, using a mechanism similar to Proxy-PAR.

Figure 17:
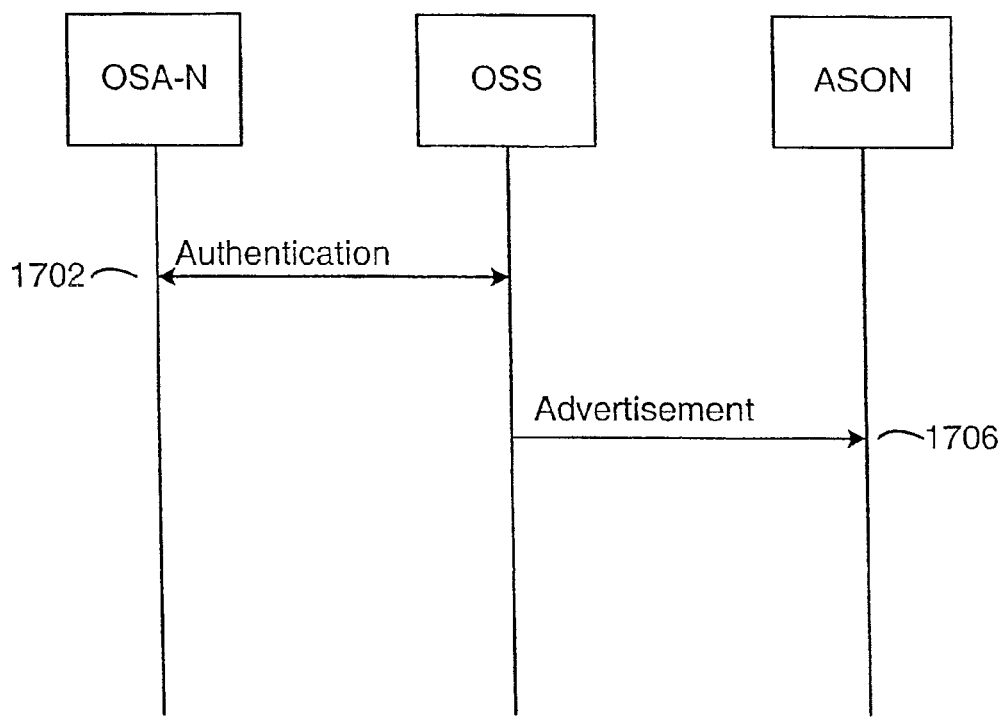
FIG. 17 is a message flow diagram depicting various exchanges between the OSA-N and the OSS in accordance with a hybrid/proxy embodiment of the present invention.

FIG. 17 is a message flow diagram depicting various exchanges between the OSA-N and the OSS in the hybrid/proxy architecture. The OSS authenticates the OSA-N through a number of exchanges 1702. After authenticating the OSA-N, the OSS determines the group identifier (ID) for the OSA-enabled user, and sends an advertisement message 1706 into the ASON. The advertisement message 1706 is flooded throughout the network.

The hybrid/proxy architecture is similar to the distributed flooding architecture, and therefore has many of the same advantageous and disadvantageous characteristics as the distributed flooding architecture. However, because the OSS rather than the OSA-N floods the advertisement, the OSS does not need to "leak" topological information to the OSA-enabled user. Therefore, there is no confusion of the separation between the NNI and the UNI.

In the ASON-coupled architecture, the various OSS services described with reference to the client-server architecture are handled by the ASON devices at the periphery of the ASON 120, with each ASON device acting as the OSS for its directly attached OSA-enabled device. The ASON-coupled architecture has many characteristics that are considered to be advantages of the ASON-coupled architecture. First because there is no central server, network performance does not depend upon the availability and reliability of a single server Second, because an ASON device services only its directly attached. OSA-enabled user, a failure of the ASON device affects only the directly attached OSA-enabled device. Third, the ASON-coupled architecture is scalable, particularly because of the one-to-one mapping between clients and servers, and also because the ASON device only needs to maintain advertisements for the group associated with its directly attached OSA-enabled user. Fourth, the amount of UNI signaling bandwidth is relatively small. Fifth, because link state advertisements are stored by the ASON device rather than in the user domain, the ASON device can detect a failure of its directly attached OSA-enabled user and invalidate the link state advertisement for the OSA-enabled user, thus allowing peer users to more quickly detect the failure of the OSA-enabled user (otherwise, the peer users would need to wait for a link state advertisement timeout to detect the failure, which, in OSPF is typically a MaxAge of 1 hour). Sixth, because the ASON device is already running ASON-specific OSPF, adding extra link state advertisements into the link state database is relatively easy. Seventh, because no topological information needs to be "leaked" to the OSA-enabled user, the separation of UNI and NNI is clear. Eighth, because the link state advertisements are handled by the ASON device, the OSA-enabled user does not necessarily need to implement OSPF, which can be a big advantage in certain applications.

Of the four OSA-N implementation architectures described above, the ASON-coupled architecture seems most suitable for typical applications, particularly because of its clearly defined separation of UNI and NNI, flexible implementation platforms, and simplicity for client systems. OSA-A must be customized on a case-by-case basis and requires a lot of close work with customer.

As discussed above, both the ASON-enabled user and the OSA-enabled user implement at least some of the ASON UNI functionality for obtaining communication services from the ASON 120. The OSA-enabled user additionally includes the OSA 610 for performing a variety of advanced communication services using the ASON UNI.

As shown and discussed with reference to FIG. 5 above, two ASON-enabled users can communicate over the ASON 120 using the ASON UNI. However, the types of communication services available to the ASON-enabled users is essentially limited to those that are provided directly by the ASON 120.

On the other hand, an OSA-enabled user can interoperate with ASON-enabled users and/or with other OSA-enabled users over the ASON 120. When interoperating with other OSA-enabled users, a full set of OSA-enabled features can be supported end-to-end across the ASON 120. When interoperating with an ASON-enabled user that does not support OSA, only a limited set of features can be supported end-to-end across the ASON 120 (such as setting up an optical communication path through the ASON 120).

Figure 18:
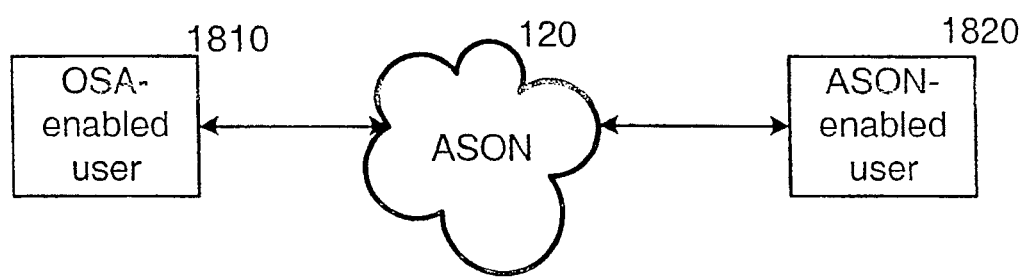
FIG. 18 is a network diagram showing an exemplary communication system in which an OSA-enabled user communicates with an ASON-enabled user over the ASON in accordance with an embodiment of the present invention.

FIG. 18 shows an exemplary communication system 1800 in which an OSA-enabled user 1810 communicates with an ASON-enabled user 1820 over the ASON 120. The ASON-enabled user 1820 implements some or all of the ASON UNI. The OSA-enabled user 1810 implements advanced functions using the ASON UNI. Because the ASON-enabled user 1820 does not implement OSA functionality, the OSA-enabled user 1810 and the ASON-enabled user 1820 can support only a limited set of features end-to-end across the ASON 120. For example, using the ASON UNI, the OSA-enabled user 1810 and the ASON-enabled user 1820 can establish an end-to-end optical communication path for communicating over the ASON 120.

Figure 19:
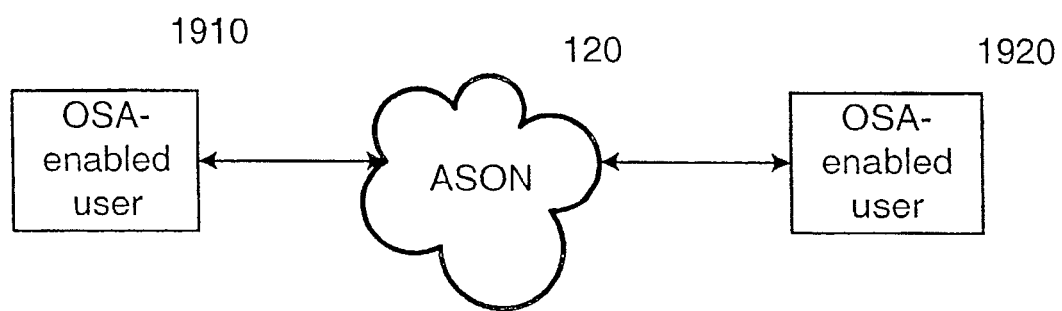
FIG. 19 is a network diagram showing an exemplary communication system in which two OSA-enabled users communicate over the ASON in accordance with an embodiment of the present invention.

FIG. 19 shows an exemplary communication system 1900 in which two OSA-enabled users 1910, 1920 communicate over the ASON 120. The OSA-enabled users 1910, 1920 implement advanced function using the ASON UNI. Because both OSA-enabled users 1910, 1920 implement OSA functionality, the OSA-enabled users 1910, 1920 can support a full set of features end-to-end across ASON 120.

In order to manage various communication services, the OSA 610 includes optical service logic that implements application-specific services and intelligence. The optical service logic interacts with the ASON 120 via the ASON UNI. The optical service logic also interacts with other OSA-enabled user via a peer-to-peer signaling mechanism. The peer-to-peer signaling mechanism enables communication between OSA-enabled users within a user network and/or across the ASON 120. Thus, using the peer-to-peer signaling mechanism, OSA-enabled users within the user network can interoperate over intra-domain signaling channels, and OSA-enabled users at the edge of the ASON 120 can interoperate across the ASON 120 over ASON signaling channels. Among other things the peer-to-peer signaling mechanism effectively extends OSA functionality to OSA-enabled users that are not at the edge of the ASON 120.

It should be noted that, while the OSA-enabled users at the edge of the ASON 120 implement the ASON UNI and interact with the ASON 120 via the ASON UNI, OSA-enabled users that are not adjacent to the ASON 120 are unable to interact directly with the ASON 120 via the ASON UNI. Therefore, such OSA-enabled users cannot directly access ASON services. Such OSA-enabled users can, however, channel ASON service requests through the OSA-enabled user at the edge of the ASON 120 using the peer-to-peer signaling mechanism. Specifically, an OSA-enabled user forwards an ASON service request to an OSA-enabled user at the edge of the ASON 120 using the peer-peer signaling mechanism. In turn, the OSA-enabled user at the edge of the ASON 120 interacts with the ASON 120 via the ASON UNI to execute the ASON service request, and responds if necessary using the peer-to-peer signaling mechanism.

Certain communication services can be managed by a OSA-enabled user. However, other communication services require that a number of OSA-enabled users interoperate to coordinate communication services. This is particularly true when communication services are coordinated end-to-end between OSA-enabled users across the ASON 120. In order for OSA-enabled users to interoperate, each OSA-enabled user needs to identify its peer OSA-enabled users and obtain various types of peer information for each peer OSA-enabled user, such as an attachment address that is used for establishing an optical communication path to the peer OSA-enabled user. Therefore, the OSA typically includes mechanisms for identifying peer OSA-enabled users and for obtaining the peer information.

In a typical embodiment of the present invention, the OSA includes auto-discovery logic by which an OSA-enabled user automatically discovers its peer OSA-enabled users and obtains the various types of peer information for each of its peer OSA-enabled users. The auto-discovery logic typically uses an advertisement mechanism for exchanging peer information between OSA-enabled users, similar to the exchanging of link state advertisements by OSPF, although the auto-discovery logic is not limited to any particular advertisement discovery mechanism. Each OSA-enabled user typically includes a peer database in which the peer information is stored. It should be noted that peer information can also be configured manually, for example, by a network administrator.

In addition to identifying peer OSA-enabled users, it is typically necessary or desirable for each OSA-enabled user to authenticate its peers. Peer authentication is important because OSA operations can affect such things as the integrity of the ASON 120 and of the network as a whole. Therefore, the OSA typically includes peer authentication logic for authenticating peer OSA-enabled users. The peer authentication logic typically uses public or private key technologies for authentication, although the peer authentication logic is not limited to any particular peer authentication mechanism.

Figure 20:
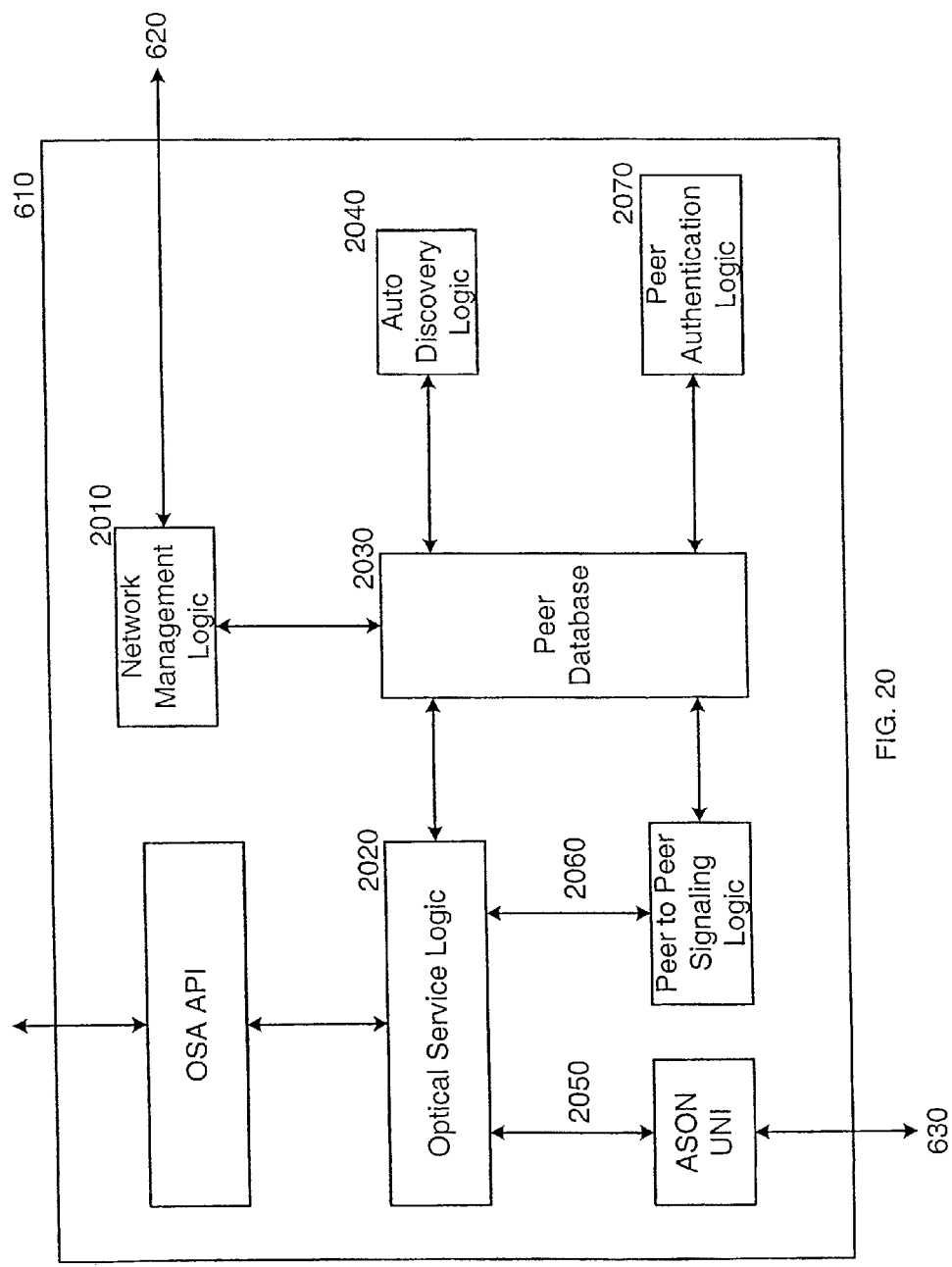
FIG. 20 is a block diagram showing relevant components of the OSA in accordance with an embodiment of the present invention.

FIG. 20 shows the relevant components of the OSA 610. Among other things, the OSA 610 includes network management logic 2010, optical service logic 2020, peer database 2030, auto-discovery logic 2040, ASON UNI 2050, peer-to-peer signaling logic 2060, and peer authentication logic 2070.

The network management logic 2010 provides for configuration and control of the OSA 610. Among other things, the network management logic 2010 interfaces with the network management/optimization elements 380 in the ASON device via the network management interface 620, and also enables remote control of the OSA 610 by a network administrator. For example, the network administrator can manually configure peer information in the peer database 2030 via the network management logic 2010.

The optical service logic 2020 implements application-specific services and intelligence. The optical logic 202 interacts with the ASON 120 via the ASON UNI 2050. The optical service logic 2020 also interacts with other OSA-enabled users via the peer-to-peer signaling logic 2060. The optical service logic 2020 may utilize peer information stored in the peer database 2030.

The peer-to-peer signaling logic 2060 enables the OSA-enabled user to communicate with other OSA-enabled users within a user network and/or across the ASON 120. Among other things, the peer-to-peer signaling mechanism effectively extends OSA functionality to OSA-enabled users that are not at the edge of the ASON 120. The peer-to-peer signaling logic 2060 may utilize peer information stored in the peer database 2030.

The auto-discovery logic 2010 enables the OSA-enabled user to automatically discover peer OSA-enabled users within a user network and/or across the ASON 120. The auto-discovery logic 2040 typically uses an advertisement mechanism for exchanging peer information between OSA-enabled users, similar to the exchanging of link state advertisements by OSPF, although the auto-discovery logic 2040 is not limited to any particular advertisement or discovery mechanism. The auto-discover logic 2040 stores peer information in the peer database 2030.

The peer authentication logic 2070 enables the OSA-enabled user to authenticate peer OSA-enabled users. Peer authentication is important because OSA operations can affect such things as the integrity of the ASON 120 and of the network as a whole. The peer authentication logic 2070 typically uses public or private key technologies for authentication, although the peer authentication logic 2070 is not limited to any particular peer authentication mechanism. The peer authentication logic 2070 may utilize and store peer information in the peer database 2030.

Figure 21:
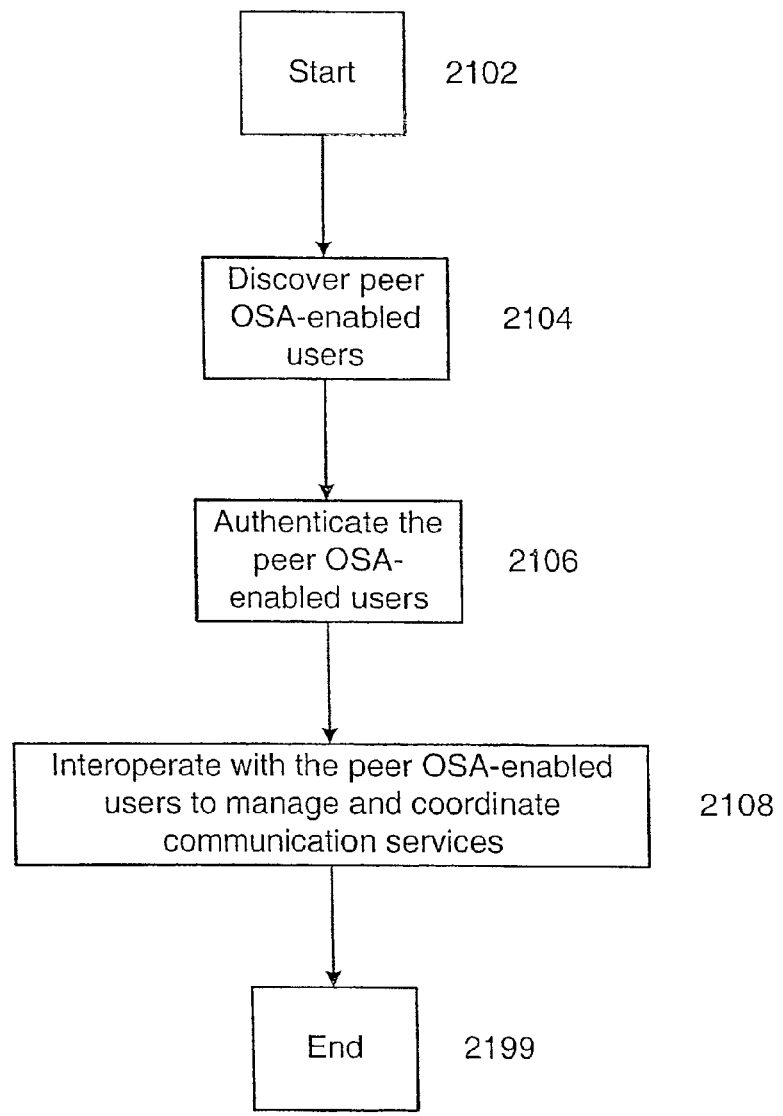
FIG. 21 is a logic flow diagram showing exemplary OSA logic for managing communication services in accordance with an embodiment of the present invention.

FIG. 21 shows exemplary OSA logic 2100 for managing communication services. Beginning at block 2102, the logic discovers peer OSA-enabled users using a predetermined auto-discovery mechanism, in block 2104. The logic authenticates the peer OSA-enabled users using a predetermined peer authentication mechanism, in block 2106. The logic then interoperates with the peer OSA-enabled users to manage and coordinate communication services, in block 2108. The logic 2100 terminates in block 2199.

In an exemplary embodiment of the present invention, an authenticated auto-discovery mechanism combining both auto-discovery and peer authentication is used to automatically identify and authenticate peer OSA-enabled users. The authenticated auto-discovery mechanism requires each OSA-enabled user to register with the ASON using an authenticated registration mechanism. A centralized advertisement scheme managed by the OSS is used to collect and distribute peer information to the peer OSA-enabled users associated with a particular peer group. Each OSA-enabled user maintains the peer information received from the OSS in its peer database.

More specifically, when an OSA-enabled user needs to access the ASON, it first establishes and activates the ASON UNI with a corresponding ASON device at the edge of the ASON. The OSA-enabled user then registers with the ASON by sending a registration message to the ASON edge device. The registration message includes, among other things, a group identifier identifying the peer group for the OSA-enabled user.

Upon receiving the registration message from the OSA-enabled user, the ASON edge device sends a challenge message to the OSA-enabled user. The challenge message provides an opportunity for the OSA-enabled user to positively identify itself to the ASON through a cryptographic authentication mechanism, for example, using predetermined public and/or private key technologies.

Upon receiving the challenge message from the ASON edge device, the OSA-enabled user formats a challenge response message. The challenge response message positively identifies itself to the ASON device using the cryptographic authentication message. The OSA-enabled user sends the challenge response message to the ASON edge device.

Upon receiving the challenge response message from the OSA-enabled user the ASON edge device authenticates the information in the challenge response message to verify and positively identify the OSA-enabled user. This authentication may require interaction with other network elements, such as a certifying authority for public key authentication or retrieval of an encryption key from a secure server (possibly the OSS) for private key authentication. If the ASON edge device is able to verify and positively identify the OSA-enabled user through the information provided in the challenge response message, then the ASON edge device sends a success message to the OSA-enabled user indicating that the registration process is complete. On the other hand, if the ASON edge device is unable to verify and positively identify the OSA-enabled user through the information provided in the challenge response message, then the ASON edge device rejects the registration, for example, by sending a rejection message to the OSA-enabled user.

Upon successfully registering the OSA-enabled user, the ASON edge device also sends a join message to the OSS in order to add the OSA-enabled user to its peer group. The join message includes, among other things, a group identifier identifying the peer group, a user identifier identifying the OSA-enabled user, and a bearer identifier identifying the bearer channel Associated with the OSA-enabled user.

The OSS maintains group membership information for the various OSA-enabled users that have registered with the ASON. Upon receiving the join message from the ASON edge device, the OSS stores the group membership information for the new OSA-enabled user identified in the join message. If the new OSA-enabled user is the first to register for the particular peer group, then the OSS sends a database synchronization message to the ASON edge device listing no peer OSA-enabled users (i.e., a NULL list). However, if the new OSA-enabled user is not the first to register for the particular peer group, then the OSS sends a database synchronization message to the ASON edge device listing the other peer OSA-enabled users, and also sends an advertisement message to the various ASON devices supporting registered OSA-enabled users listing at least the new OSA-enabled user.

Upon receiving the database synchronization message from the OSS, the ASON edge device determines whether any peer OSA-enabled users are listed in the database synchronization message. If there is at least on peer OSA-enabled user listed in the database synchronization message, then the ASON edge device sends a new neighbor message to the OSA-enabled user listing the peer OSA-enabled users and their respective bearer identifiers. However, if there are no peer OSA-enabled users listed in the database synchronization message (i.e., the list is NULL), then the ASON edge device typically does not send the new neighbor message to the OSA-enabled user, since the peer database maintained by the OSA-enabled user is NULL by default.

Each ASON device that receives an advertisement message from the OSS sends a new neighbor message to its respective OSA-enabled user including the list of peer OSA-enabled users from the advertisement message. The new neighbor message identifies the new OSA-enabled user to all existing OSA-enabled users in the peer group.

Upon receiving a new neighbor message from its corresponding ASON device, an OSA-enabled user stores the peer information from the new neighbor message in its peer database.

Thereafter, whenever a new OSA-enabled user registers with the peer group the OSS sends an advertisement message to those ASON devices that support registered OSA-enabled devices in the peer group. The advertisement message identifies at least the new OSA-enabled user and its bearer identifier, and may also list some or all of the other peer OSA-enabled users and their respective bearer identifiers. Each ASON device that receives an advertisement message from the OSS sends a new neighbor message to its respective OSA-enabled user listing the peer OSA-enabled users and their respective bearer identifiers. Each OSA-enabled user that receives a new neighbor message from its corresponding ASON device stores the peer information in its peer database.

Figure 22:
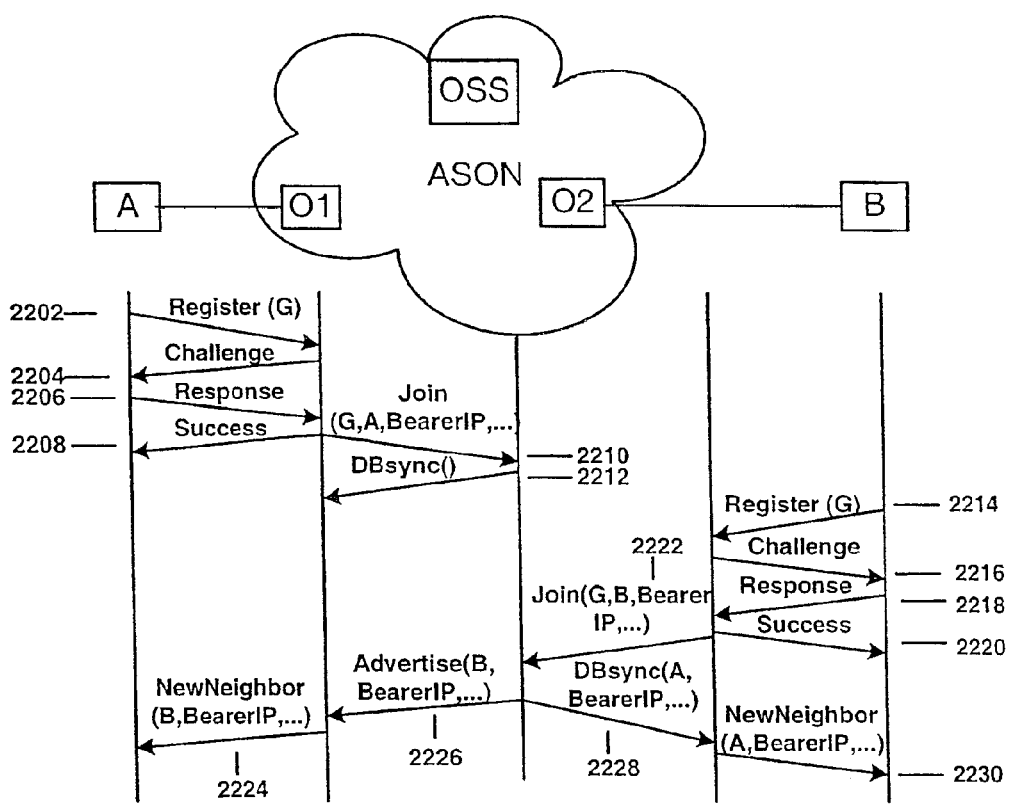
FIG. 22 is a message flow diagram demonstrating an authenticated auto-discovery process in accordance with an embodiment of the present invention.

FIG. 22 is a message flow diagram demonstrating the authenticated auto-discovery process between OSA-enabled user A and OSA-enabled user B. The OSA-enabled user A accesses the ASON through ASON device O1. The OSA-enabled user B accesses the ASON through ASON device O2. In this example, it is assumed that the OSA-enabled user A is the first to register for the peer group G, and the OSA-enabled user B is the second to register for the peer group G.

In order to register with the ASON, the OSA-enabled user A sends registration message 2202 to the ASON device O1 indicating peer group G. The ASON device O1 sends challenge message 2204 to the OSA-enabled user A. The OSA-enabled user A sends challenge response message 2206 to the ASON device O1. The ASON device O1 sends success message 2208 to the OSA-enable user A, and also sends join message 2210 to the OSS including group identifier for peer group G, user identifier for OSA-enabled user A, and bearer identifier for the bearer channel to OSA-enabled user A. The OSS sends database synchronization (DBsync) message 2212 to the ASON device O1 with a NULL list of peer OSA-enabled users. The ASON device O1 does not send a new neighbor message to the OSA-enabled user A.

In order to register with the ASON, the OSA-enabled user B sends registration message 2214 to the ASON device O2 indicating peer group G. The ASON device O2 sends challenge message 2216 to the OSA-enabled user B. The OSA-enabled user B sends challenge response message 2218 to the OSA-enabled device O2. The ASON device O2 sends success message 2220 to the OSA-enabled user B, and also sends join message 2222 to the OSS including group identifier for peer group G, user identifier for OSA-enabled user B, and bearer identifier for the bearer channel to OSA-enabled user B. The OSS sends database synchronization (DBsync) message 2228 to the ASON device O2 with listing OSA-enabled user A as a peer OSA-enabled user, and also sends advertisement message 2226 to the ASON device O1 indicating OSA-enabled user B as a new peer OSA-enabled user. The ASON device O1 sends new neighbor message 2224 to the OSA-enabled user A including peer information for OSA-enabled user B, and the OSA-enabled user A adds OSA-enabled user B to its peer database. The ASON device O2 sends new neighbor message 2230 to the OSA-enabled user B including peer information for OSA-enabled user A, and the OSA-enabled user B adds OSA-enabled user A to its peer database. At this point, the OSA-enabled user A has successfully identified and authenticated the OSA-enabled user B, and the OSA-enabled user B has successfully identified and authenticated the OSA-enabled user A.

Each ASON device monitors the connection to its corresponding OSA-enabled user. If the ASON device detects loss or degradation of the connection the OSA-enabled user (e.g., due to a failure of the ASON UNI, the bearer channel or the OSA-enabled device itself), then the ASON device sends a leave message to the OSS to remove the OSA-enabled user from the peer group. The OSS removes the OSA-enabled user from the peer group, and sends an advertisement message to the various ASON devices that support registered OSA-enabled users indicating the removed OSA-enabled users. Each ASON device in turn sends an update message to its corresponding OSA-enabled user indicating the removed OSA-enabled user. Each OSA-enabled user deletes the removed OSA-enabled user from its respective peer database.

Figure 23:
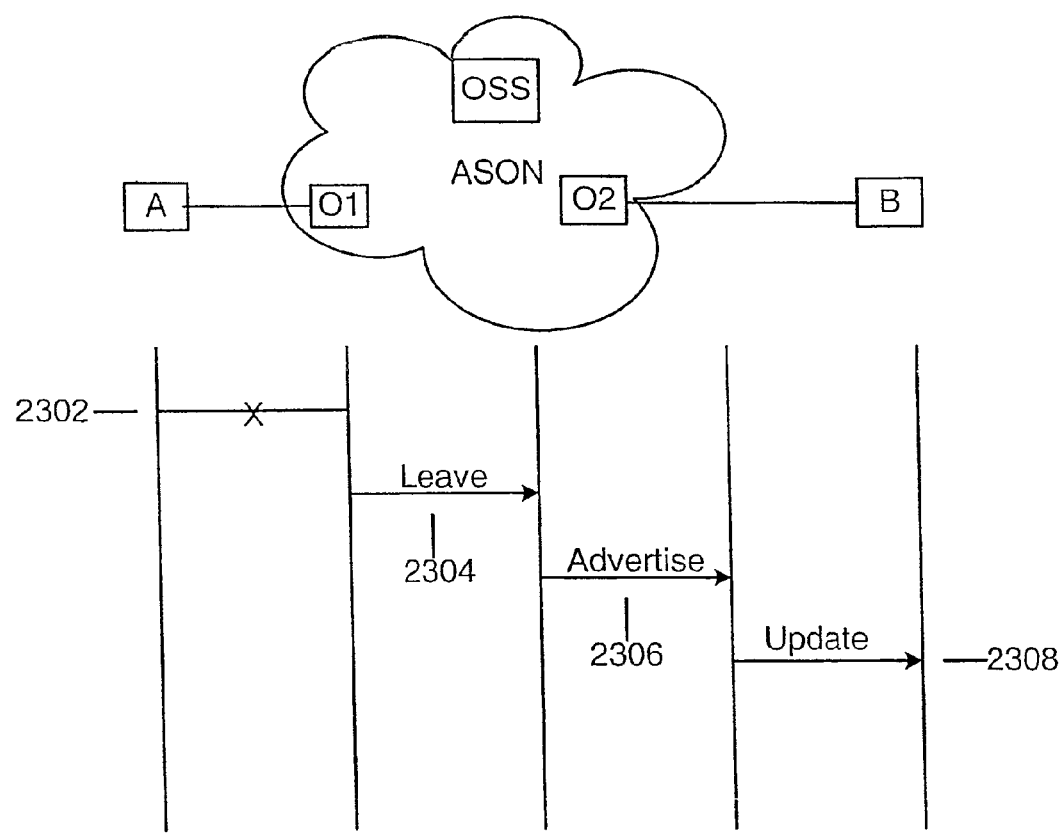
FIG. 23 is a message flow diagram demonstrating the process of removing an OSA-enabled user from a peer group in accordance with an embodiment of the present invention.

FIG. 23 is a message flow diagram demonstrating the process of removing an OSA-enabled user from a peer group. Upon detecting loss or degradation of the connection to the OSA-enabled user, as represented by 2302, the ASON device O1 sends leave message 2304 to the OSS. The OSS removes the OSA-enabled device A from the peer group, and sends advertisement message 2306 to the ASON device O2. The ASON device O2 sends update message 2308 to the OSA-enabled user B indicating that the OSA-enabled user A is no longer a member of the peer group, and the OSA-enabled user B removes the OSA-enabled user A from its peer database.

It should be noted that, when an OSA-enabled user interoperates with an ASON-enabled user, as shown and described with reference to FIG. 18 above, there is essentially no peer-to-peer relationship between the OSA-enabled user and the ASON-enabled user. Consequently, many of the OSA's peer-to-peer mechanisms are not available for interoperation between the OSA-enabled user and the ASON-enabled user. Specifically, the ASON-enabled user does not support OSA auto-discovery, peer authentication, and peer-to-peer signaling mechanism. Therefore, the OSA-enabled user typically cannot auto-discover, authenticate, and perform peer-to-peer signaling with the ASON-enabled user. This has certain practical implications. For example, an ASON-enabled user receiving a request from an OSA-enabled user would be unable to authenticate the OSA-enabled user, and therefore would generally have to accept the request unconditionally. This poses a security/reliability risk that may be unacceptable in some situations.

It should also be noted that optical communication services may be provided by multiple service and infrastructure providers. The OSA can manage communication services provided by these multiple service and infrastructure providers.

As discussed above, the OSA is an intelligent agent that manages various communication services on behalf of the network user. The OSA interacts with the ASON to obtain various communication services, and manages those services for the network user based upon predetermined parameters defined by the network user. The OSA can manage practically any communication services the have heretofore been managed manually.

The related application entitled SYSTEM, DEVICE, AND METHOD FOR MANAGING CONNECTION ESTABLISHMENT AND RELATED SERVICES IN AN OPTICAL, COMMUNICATION SYSTEM, which was incorporated by reference above, discusses various connection establishment services that can be managed by the OSA. For example, the OSA can negotiate various connection and connection-related services on behalf of the user, model one or more connections for the user, reserve connection and connection-related services for the user, establish a connection for the user, and aggregate multiple optical communication paths over a connection, to name but a few.

As described above, the ASON provides various protection mechanisms (e.g., 1+1, 1:1, 1:N, etc.) for the optical communication path. The ASON protection mechanisms provide recovery from certain failures/degradations that occur between user end-system connected to the ASON. Unfortunately, the ASON protection mechanisms do not provide recovery from failures/degradations that occur within the user network, such as failure/degradation affecting the link to the user end-system or the user end-system itself. Thus, the ASON protection mechanisms do not provide end-to-end protection for the optical communication path.

Therefore, in an embodiment of the present invention, the OSA manages alternate site switching for end-to-end protection of the optical communication path on behalf the user.

This alternate site switching (referred to hereinafter as alternate site failover or ASF) typically involves among other things, setting up a failover tree to facilitate switching to the backup end-system(s). Briefly, the failover tree is a pseudo-multicast tree rooted at an intermediate OXC within the ASON. The root OXC uses the failover tree to perform the actual switching of communications from the primary end-system to the backup end-system using multicast-like mechanism. The degree of the failover tree is preferably kept low in order to avoid long signaling delays during a failover.

Figure 24:
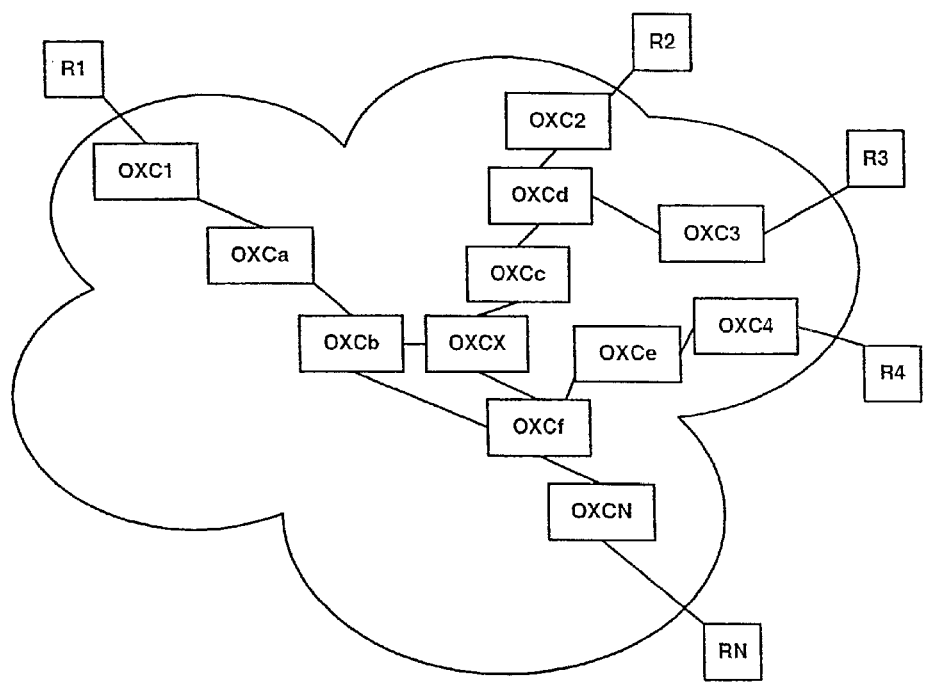
FIG. 24 is a network diagram showing an exemplary communication system having five user end-systems in communication over an ASON in accordance with an embodiment of the present invention.

FIG. 24 is a network diagram showing an exemplary communication system 2400 having five user end-systems R1, R2, R3, R4, and RN in communication over an ASON. The ASON includes a number of interconnected OXC nodes. The user end-system R1 interfaces with the ASON via ASON edge node OXC1. The user end-system R2 interface with the ASON via ASON edge node OXC2. The user end-system R3 interfaces with the ASON via ASON edge node OXC3. The user end-system R4 interfaces with the ASON via ASON edge node OXC4. The user end-system RN interfaces with the ASON via ASON edge node OXCN. The ASON edge nodes OXC1, OXC2, OXC3, OXC4 and OXCN communicate ASON intermediate nodes OXCa, OXCb, OXCc, OXCd, OXCe, OXCf, and OXCX.

In a typical embodiment of the present invention, the user specifies one or more backup end-systems when requesting a lightpath to the primary end-system. The uses also typically specifies a maximum failover time. The maximum failover time is typically specified in terms of the signaling distance H. Assuming each hop has a signaling distance of one, then the maximum failover time is essentially the maximum number of round-trip signaling hops between the root OXC end each backup end-system.

Establishment of the requested lightpath as well as the requested protection is typically handled by the ASON edge node associated with the user, and more particularly by the OSA-N in the ASON edge node. This is a logical place to handle these functions, in part because the OSA-N can interact directly with the OSA-A in the user end-system via the control interface and can access topology information maintained by the ASON edge node (for example, topology information from a link-state routing protocol such as OSPF).

In the exemplary communication system shown and described with reference to FIG. 24, the user end-system R1 requires a lightpath to user end-system R2 and protection from user end-systems R3, R4, and RN, the user end-system R1 sends a SETUP request message to the ASON edge node OXC1. In the SETUP request message, the user end-system R1 specifies user end-system OXC as the primary end-system, user end-system R3, R4, and RN as the backup end-systems, and a maximum failover time constraint H.

Upon receiving the request from the user, the OSA-N in the ASON edge node OXC1 attempts to find a root OXC for the failover tree. In an embodiment of the present invention, the root OXC should have certain attributes. For example, the root OXC must be within H/2 hops of a backup end-system. In order to meet the maximum failover time constraint H. Furthermore, a shortest-path spanning tree rooted at the root OXC and extending to the ASON edge nodes associated with the backup end-systems should not include any link on the path from the ASON edge node associated with the protected end-system to the root OXC. If the OSA-N is unable to find a suitable root OXC for the failover tree, then the OSA-N typically rejects the user request, in which case the user typically increases H or specifies different backup end-systems. If the OSA-N is able to find a suitable root OXC, then the OSA-N proceeds to set up the failover tree rooted at the root OXC.

Figure 25:
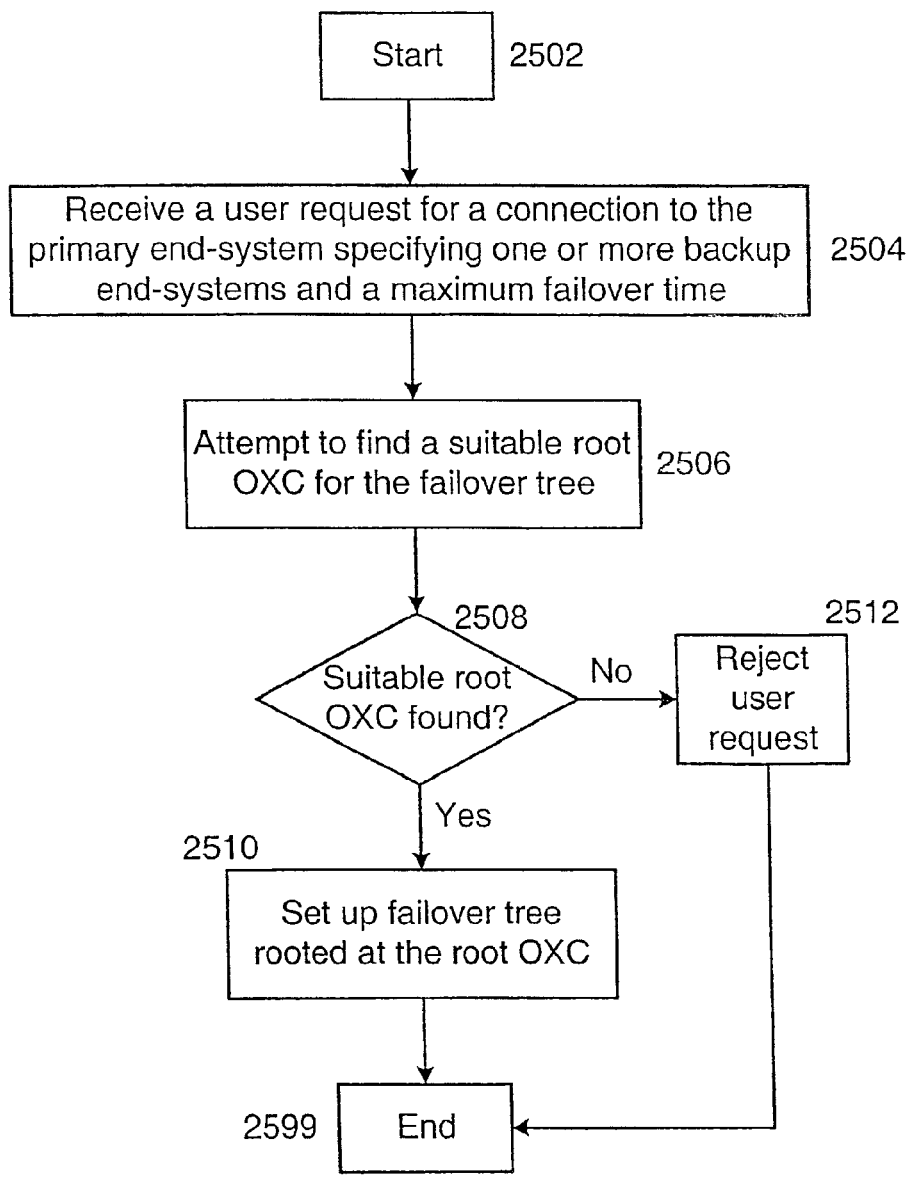
FIG. 25 is a logic flow diagram showing exemplary OSA-N logic for processing a setup request by the OSA-N in the ASON edge node in accordance with an embodiment of the present invention.

FIG. 25 is a logic flow diagram showing exemplary OSA-N logic 2500 for processing the SETUP request by the OSA-N in the ASON edge node OXC1. Beginning at block 2502, and upon receiving a user request for a connection to the primary end-system specifying one or more backup end-systems and a maximum failover time, in block 2504, the OSA-N attempts to find a suitable root OXC for the failover tree, in block 2506. If the OSA-N is able to find a suitable root OXC for the failover tree (YES in Nock 2508), then the OSA-N sets up the failover tree rooted at the root OXC, in block 2510. If the OSA-N is unable to find a suitable root OXC for the failover tree (NO in block 2508), then the OSA-N rejects the SETUP request in block 2512. The logic 2500 terminates in block 2599.

In order to find a suitable root OXC for the failover tree as in block 2506, the OSA-N typically identifies a number of candidate OXCs that are within H/2 hops of at least one backup end-system. If there are no such candidate OXCs, the OSA-N is unable to find a suitable root OXC for the failover tree using the specified backup end-systems and maximum failover time. If there is at least one such candidate OXC however, then, beginning with the candidate OXC that is within H/2 hops of the most backup end-systems, tests the candidate OXCs one at a time until a suitable root OXC is found. Specifically, after selecting a candidate OXC for testing, the OSA-N constructs a shortest-path spanning tree rooted at the candidate OXC and extending to the ASON edge nodes associated with the backup end-systems. The OSA-N then determines whether the shortest-path spanning tree includes any link on the path from the ASON edge node associated with the protected end-system to the candidate OXC. If the shortest-path spanning tree does not include any link on the path from the ASON edge node associated with the protected end-system to the candidate OXC, then the OSA-N considers the candidate OXC to be suitable as a root OXC for the failover tree, and typically stops testing candidate OXC. If, however, the shortest-path tree does include a ink on the path from the ASON edge node associated with the protected end-system to the candidate OXC, then the OSA-N considers the candidate OXC to be unsuitable as root OXC for the failover tree, and continues testing candidate OXCs. If the OSA-N tests all candidate OXCs without finding a suitable root OXC, then the OSA-N is unable to find a suitable root OXC for the failover tree using the specified backup end-system.

The OSA-N can identify candidate OXCs in any of a variety of ways, and the present invention is not limited to any particular way in which the OSA-N identifies candidate OXCs.

One way for the OSA-N to identify candidate OXCs uses a marking technique. Specifically, the OSA-N identifies the ASON edge nodes associated with the primary end-system R2 and the backup end-systems R3, R4, and RN. Then, for each such ASON edge node, the OSA-N "marks" all intermediate OXCs that are within H/2 hops of the ASON edge node. In this way, an intermediate OXC that is within H/2 hops of only one such ASON edge node receives one "mark," an intermediate OXC that is with H/2 hops of two such ASON edge nodes receives two "marks," and so on. The intermediate OXC receiving the most "marks" is considered to be the best candidate OXC.

Figure 26:
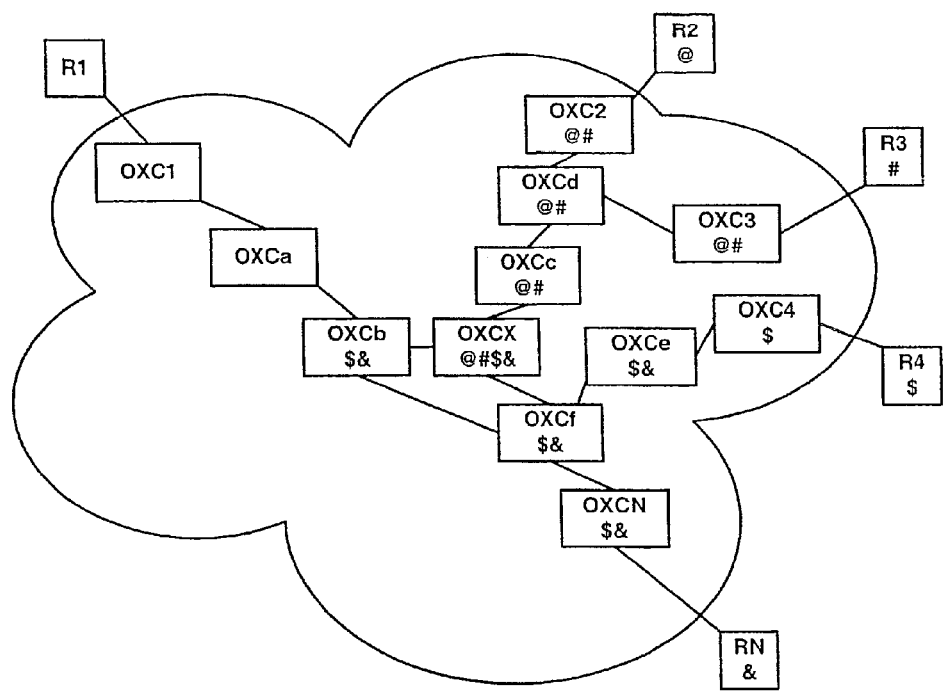
FIG. 26 is a network diagram that demonstrates an exemplary marking technique by which the OSA-N identifies candidate OXCs in accordance with an embodiment of the present invention.

FIG. 26 is a network diagram that is used herein to demonstrate the described marking technique by which the OSA-N identifies candidate OXCs. In this example, the maximum failover time H is equal to six hops. Thus, each candidate OXC must be within three (i.e., H/2) hops of an ASON edge node.

For the purpose of demonstration, the primary end-system R2 and the backup end-systems R3, R4, and RN are designated with the symbols "@," "#," "$," and "&," respectively, for differentiating the marks associated with each user end-system.

In order to identify candidate OXCs associated with primary end-system R2, the OSA-N marks each OXC that is within three hops of the ASON edge node OXC2. As shown in FIG. 26, OXCs within three hops of the ASON edge node OXC2 include OXC2, OXCd, OXC3, OXCe, and OXCX, which are all mucked with the symbol "@."

In order to identify candidate OXCs assorted with backup end-system R3, the OSA-N marks each OXC that is within three hops of the ASON edge node OXC3. As shown in FIG. 26, OXCs within three hops of the ASON edge node OXC3 include OXC3, OXCd, OXC2, OXCe, and OXCX, which are all marked with the symbol "#."

In order to identity candidate OXCs associated with backup end-system R4, the OSA-N marks each OXC that is within three hops of the ASON edge node OXC4. As shown in FIG. 26, OXCs within three hops of the ASON edge node OXC4 include OXC4, OXCe, OXCf, OXCN, OXCb, and OXCX, which are all marked with the symbol "$."

In order to identify candidate OXCs associated with backup end-system RN, the OSA-N marks each OXC that is within three hops of the ASON edge node OXCN. As shown in FIG. 26, OXCs within three hops of the ASON edge node OXCN include OXCN, OXCf, OXCe, OXCb, and OXCX, which are all marked with the symbol "&."

It should be noted that, for convenience, FIG. 26 does not necessarily show all markings.

Another way to identify a candidate OXC is to treat the problem as a geometric problem. Given a set of points in the XY plane, find a point that has the same minimal distance to all the outer points. One way to do this is to draw a ring centered at the outer points, and find a point that is covered by all the rings. A formal algorithmic description of this is described later.

If the OSA-N is unable to identify at least one candidate OXC that is within the maximum failover time H, then the OSA-N typically rejects the user request. If however, the OSA-N is able to identify at least one candidate OXC that is within the maximum failover time H, then the OSA-N typically attempts to qualify one of the candidate OXCs as a suitable root OXC for the failover tree. Specifically, beginning with a "best" candidate OXC, the OSA-N tests the candidate OXCs one at a time until a suitable root OXC is found.

In the example shown and described with reference to FIG. 26, the "best" candidate OXC is considered to be the intermediate node OXCX, which has the largest number of marks and is within three hops of the primary end-systems and all backup end-systems. The OSA-N tests the intermediate node OXCX to determine whether it is suitable as the root OXC for the failover tree. Specifically, the OSA-N constructs a shortest-path spanning tree that is rooted at the intermediate node OXCX and extends out to the ASON edge nodes OXC2, OXC3, OXC4 and OXCN. In this example, the shortest-path spanning tree typically includes nodes OXCc, OXCd, OXC2, OXC3, OXCf, OXCe, OXC4, and OXCN. The OSA-N then determines whether the shortest-path spanning tree includes a link on the path from the ASON edge node OXC1 to intermediate node OXCX. In this example, the shortest-path spanning tree does not include a link on the path from the ASON edge node OXC1 to intermediate node OXCX. Thus, the OSA-N considers the intermediate node OXCX to be a suitable root OXC for the failover tree.

Figure 27:
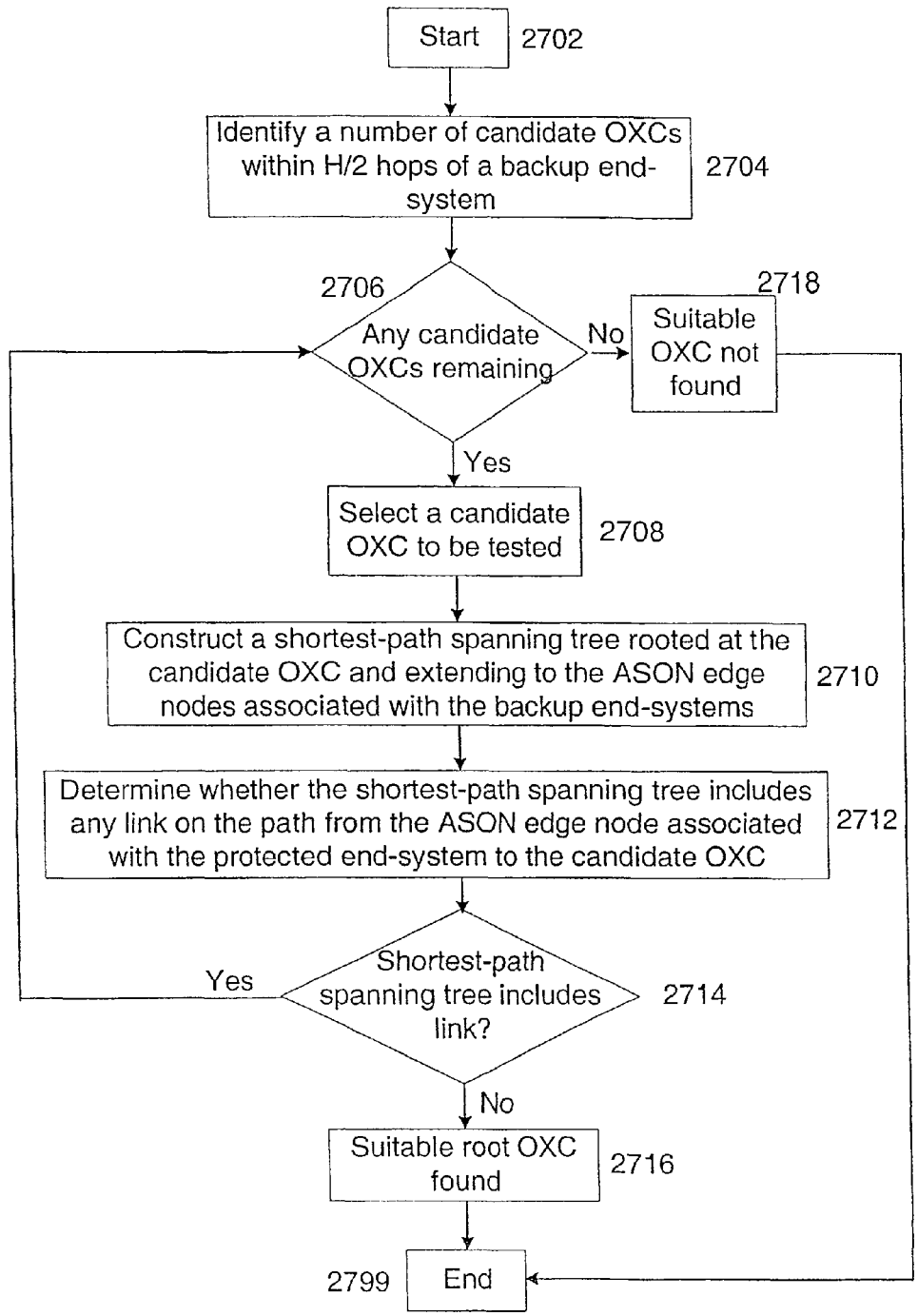
FIG. 27 is logic flow diagram showing exemplary OSA-N logic for finding a suitable root OXC in accordance with an embodiment of the present invention.

FIG. 27 is a logic flow diagram showing exemplary OSA-N logic 2700 for finding a suitable root OXC as in block 2506. Beginning at block 2702, the OSA identifies a number of candidate OXCs within H/2 hops of a backup end-system, in block 2704. If no such candidate OXCs are found (NO in block 2706), then no suitable root OXC is found, in block 2718. However, if at least one candidate OXC is found (YES in block 2706), then the OSA-N selects a candidate OXC to be tested, in block 2708. The OSA-N typically begins testing the candidate OXC that is within H/2 hops of the most backup end-systems. p The OSA-N constructs a shortest-path spanning tree rooted at the candidate OXC and extending to the ASON edge nodes associated with the backup end-systems, in block 2710. The OSA-N then determines whether the shortest-path spanning tree includes any link on the path from the ASON edge node associated with the protected end-system to the candidate OXC, in block 2712. If the shortest-path spanning tree does not include any link on the path from the source ASON edge node associated with the protected end-system to the candidate OXC (NO in block 2714), then the OSA-N considers the candidate OXC to be suitable as a root OXC for the failover tree, and typically stops testing candidate OXCs, in block 2716. If, however, the shortest-path tree does include a link on the path from the source ASON edge node associated with the protected end-system to the candidate OXC (YES in block 2714), then the OSA-N considers the candidate OXC to be unsuitable as a root OXC for the failover tree, and recycles to block 2706 to continue testing candidate OXCs. If there is at least one candidate OXC remaining to be tested (YES in block 2706), then the OSA-N proceeds to block 2708 to test the candidate OXC. If, however, there are no candidate OXCs remaining to be tested (NO in block 2706), then no suitable root OXC is found, in block 2716. The logic 2700 terminates in block 2799.

When the OSA-N identifies a suitable root OXC for the failover tree, the OSA-N constructs the failover tree rooted at the root OXC. This typically involves the OSA-N sending an NNI lightpath setup request that signals the various ASON nodes to set up the lightpath from the user end-system R1 to the primary end-system R2 through the root OXC and to set up the failover tree rooted at the root OXC. In order to accomplish the lightpath setup and the failover tree setup, the NNI lightpath setup request typically specifies the nodes associated with the lightpath as well as the nodes associated with the failover tree. It should be noted that a particular node may be associated with the lightpath alone, the failover tree alone, or both the lightpath and the failover tree. Nodes that are associated with the lightpath alone reserve lightpath resources accordingly. Nodes that are associated with the failover tree alone record the structure of the failover tree, but do not reserve lightpath resources. Nodes that are associated with both the lightpath and the failover tree reserve lightpath resources accordingly and record the structure of the failover tree.

Thus, in the example shown and described with reference to FIG. 26, the OSA-N in the ASON edge node OXC1 sends an NNI lightpath setup request that signals the various ASON nodes to set up the lightpath from the user end-system R1 to the primary end-system R2 through the intermediate node OXCX and to set up the failover tree rooted at the intermediate node OXCX. The NNI lightpath setup request typically specifies the nodes associated with the lightpath as well as the nodes associated with the failover tree using a special signaling mechanism that uses a special flag to identify the nodes that are associated with the failover tree alone. The following is a representing of the NNI lightpath setup request for establishing the lightpath from the user end-system R1 to the primary end-system R2 and establishing the failover tree to backup end-system R3, R4, and RN, with a special flag (denoted in bold) indicating those nudes that are associated with the failover tree alone:

OXC1→OXCa→OXCb→OXCX (OXCc (OXCd (OXC2, OXC3)), OXCf (OXCe (OXC4), OXCN))

Using this information, each node is able to determine whether it is associated with the lightpath alone, the failover tree alone, or both the lightpath and the failover tree. Nodes OXC1, OXCa, and OXCb are associated with the lightpath alone, and therefore reserve lightpath resources accordingly. Nodes OXCX, OXCc, OXCd, and OXC2 are associated with both the lightpath and the failover tree, and therefore reserve lightpath resources accordingly and record the structure of the failover tree. Nodes OXC3, OXCf, OXCe, OXC4, and OXCN are associated with the failover tree alone, and therefore record the structure of the failover tree but do not reserve lightpath resources.

Figure 28:
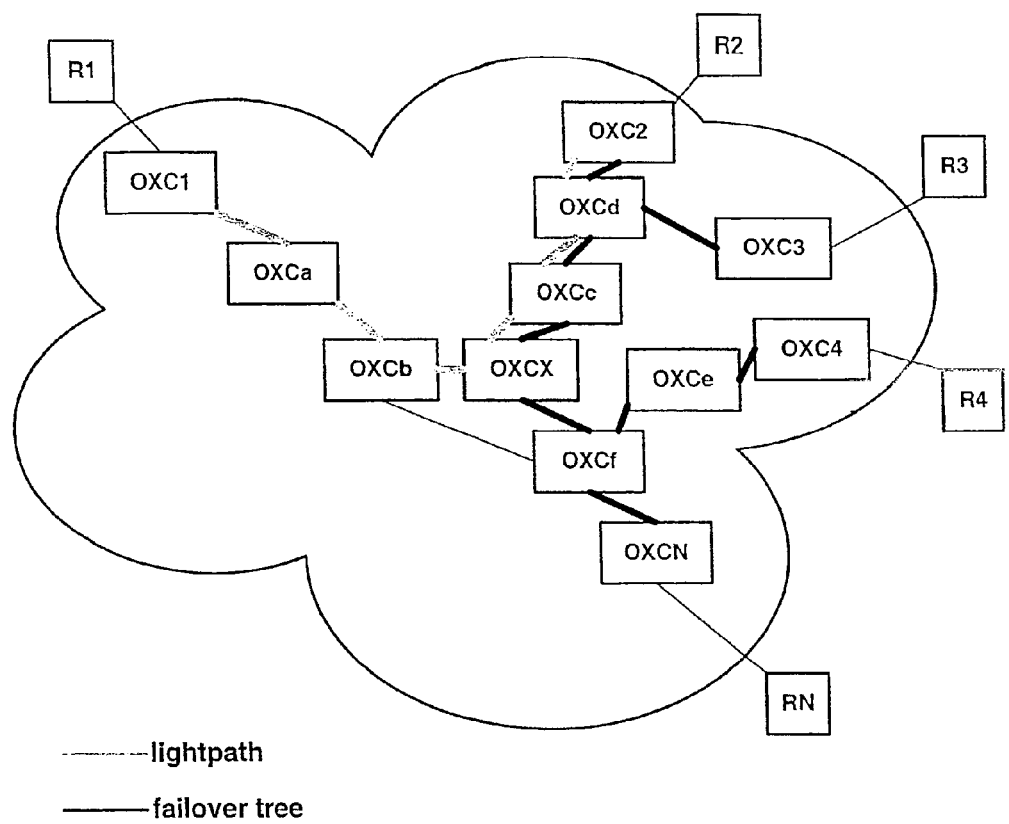
FIG. 28 is a network diagram showing an exemplary lightpath and failover tree formed by the ASON nodes in accordance with an embodiment of the present invention.

FIG. 28 is a network diagram showing the lightpath and failover tree that are formed by the ASON nodes. The lightpath includes nodes OXC, OXCa, OXCb, OXCX, OXCc, OXCd, and OXC2. The failover tree includes nodes OXCX, OXCc, OXCd, OXC2, OXC3, OXCf, OXCe, OXC4, and OXCN.

When a failure or degradation affecting the primary end-system is detected, the OSA-N in the corresponding ASON edge node (referred to hereinafter as the primary edge node for convenience) sends a leave message to the OSS, which in turn de-registers the primary end-user or otherwise updates its database to indicate the unavailability of the primary end-system. The OSA-N in the primary edge node also sends a release message to its parent node (i.e., the upstream neighboring node along the lightpath). The release message may be propagated upstream toward the root OXC until it reaches a node that supports a downstream backup end-system. For convenience, this node is referred to hereinafter as the failover OXC. It should be noted that the failover OXC may be the parent node of the primary edge node, the root OXC, or an intermediate OXC between the parent node and root OXC. The primary edge node and each node that receives the release message relinquish lightpath resources for the lightpath to the primary end-system. The failover OXC then sends an NNI lightpath setup request message downstream toward the backup end-system in order to establish the lightpath to the backup end-system. The lightpath identifier for this backup lightpath is the same as the lightpath identifies for the defunct primary lightpath. Each node between the failover OXC and the backup end-system reserves lightpath resources accordingly. The ASON edge node associated with the backup end-system (referred to hereinafter as the backup edge node) sends a connect message to the failover OXC. This prompts the failover OXC to make any necessary switching changes to divert the traffic flow from the defunct primary lightpath to the new backup lightpath.

Figure 29:
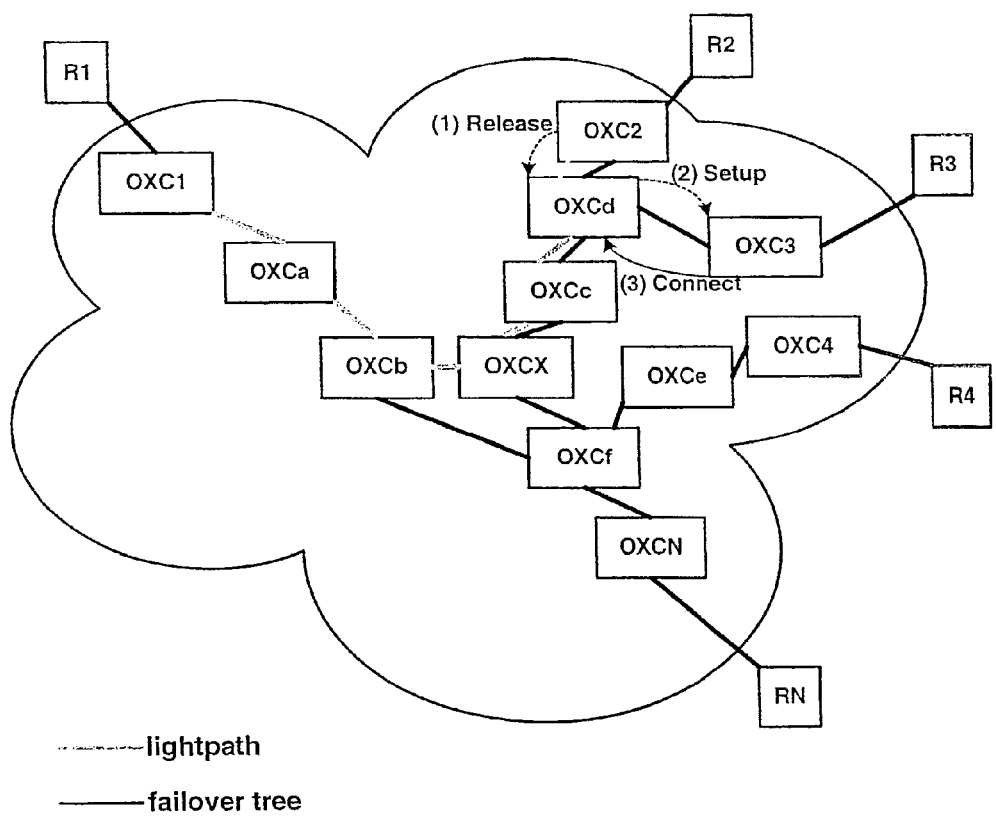
FIG. 29 is a network diagram showing the establishment of the backup lightpath upon detecting a degradation or failure affecting the primary lightpath in accordance with an embodiment of the present invention.

FIG. 29 is a network diagram showing the establishment of the backup lightpath upon detecting a degradation or failure affecting the primary lightpath. When a degradation or failure affecting the primary end-system R2 is detected, the OSA-N in the primary edge node OXC2 sends a parent message to the OSS (not shown), and also sends a release message to its parent node OXCd. Since the parent node OXCd supports a downstream backup end-system, the parent node OXCd is considered to be the failover OXC. Thus, the failover node OXCd does not propagate the release message upstream toward OXCX (i.e., the root OXC). Both the primary edge node OXC2. Thus, failover node OXCd relinquish lightpath resources for the primary lightpath. The failover node OXCd sends an NNI lightpath setup request message to the backup edge node OXC3 in order to set up a lightpath to backup end-system R3. In response, the backup edge node OXC3 sends a connect message to the failover node OXCd, which causes the failover node OXCd to switch over the incoming bearer channel for the primary lightpath to the newly created outgoing bearer channel for the backup lightpath.

Figure 30:
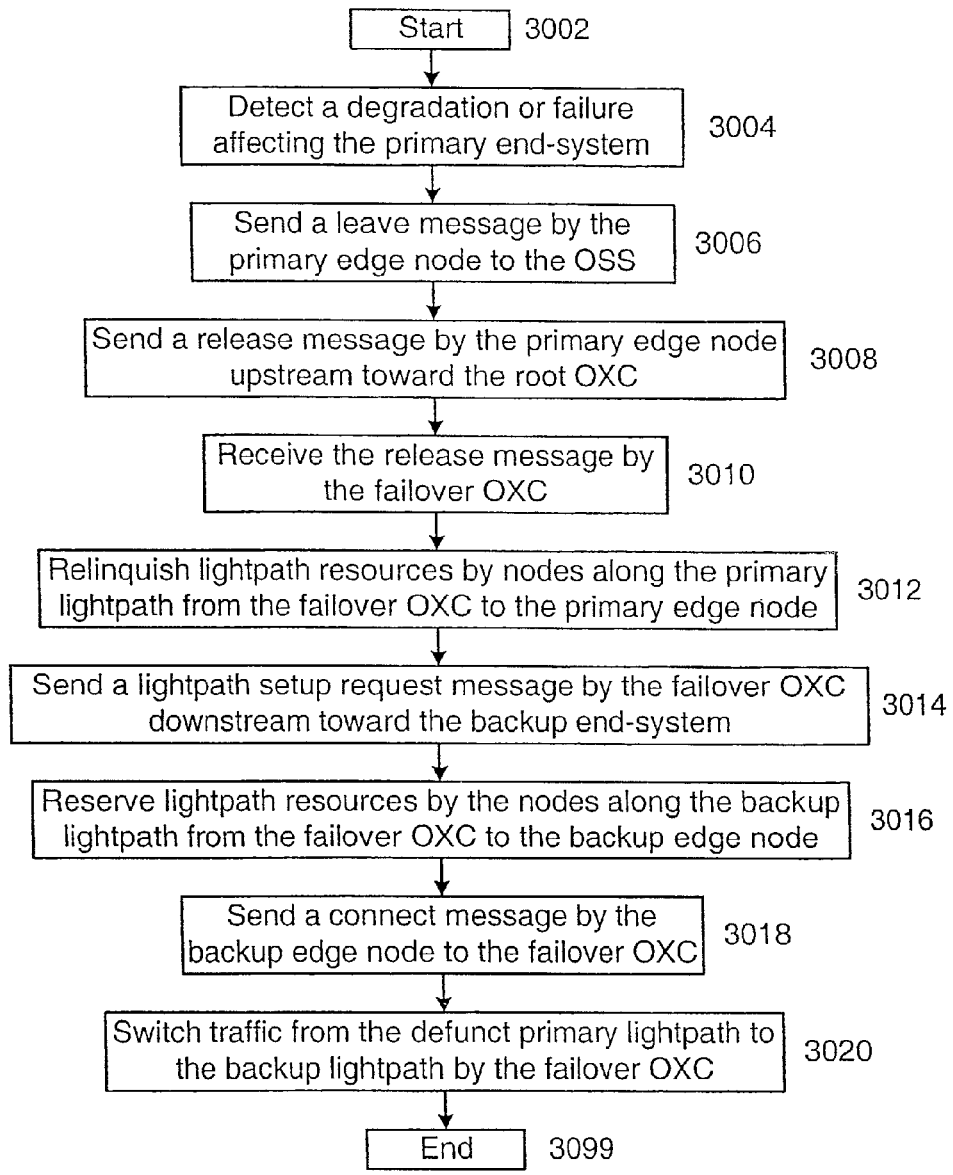
FIG. 30 is a logic flow diagram showing exemplary logic for performing alternate site failover switching from a primary end-system to a backup end-system in accordance with an embodiment of the present invention.

FIG. 30 is a logic flow diagram showing exemplary logic 3000 for performing ASF switching from a primary end-system to a backup end-system. Beginning at block 3002, and upon detecting a degradation or failure affecting the primary end-system, in block 3004, the primary edge node sends a leave message to the OSS, in block 3006. The primary edge node also sends a release message upstream toward the root OXC, in block 3008. The release message is propagated node-by-node upstream toward the root OXC until it is received by the failover OXC, in block 3010. The nodes along the primary lightpath from the failover OXC to the primary edge node relinquish lightpath resources, in block 3012. The failover OXC sends a lightpath setup request message downstream toward the back end-system, in block 3014. The nodes along the backup lightpath from the failover OXC to the backup edge node reserve lightpath resources for the backup lightpath, in block 3016. The backup edge node sends a connect message to the failover OXC, in block 3018. Upon receiving the connect message, the failover OXC switches traffic from the defunct primary lightpath to the backup lightpath, in block 3020. The logic terminates in block 3099.

Once traffic has been switched to a backup end-system, that backup end-system can be protected by other backup end-systems as if it was the primary end-system. Thus, in the example above, traffic can be switched to backup end-system R4 or backup end-system RN upon detecting a degradation or failure affecting the lightpath to backup end-system R3. The mechanism for switching from one backup end-system to another backup end-system is similar to the mechanism for switching from the primary end-system to a backup end-system.

If and when the primary end-system becomes available, traffic can be switched from a backup end-system back to the primary end-system. Thus, in the example above, traffic can be switched from the backup end-system R3 back to the primacy end-system R2 upon determining that the primary end-system R2 is available. The mechanism for switching from a backup end-system back to the primary end-system is similar to the mechanism for switching from the primary end-system to a backup end-system.

Alternatively, if and when the primary end-system becomes available, the primary end-system can be used to protect the backup end-system to which the lightpath was switched. Thus, in the example above, the primary end-system R2 can be used as a backup end-system for the backup end-system R3 such that traffic can be switched back to the primary end-system R2 upon detecting a degradation or failure affecting the backup end-system R3. The mechanism for switching from a backup end-system back to the primary end-system is similar to the mechanism for switching from the primary end-system to a backup end-system.

The preceding discussion describes the general outline of typical embodiments of the present invention. We now offer some additional details regarding various aspects of some specific embodiments. While the discussion may provide insight into implementation details of such specific embodiments, the invention is not restricted to or limited by such specific details. Thus, the details of other embodiments may differ from what is described.

An ASON can be modeled as a weighted graph G=(V, E), which includes a set of internal switches, V, and a set of bi-directional control links, E. Each control link can be associated with a signaling distance, $WEIGHT_E$. An ASF SETUP request has three parameters (S, D, H), where S∈V, is the source node; D, where each element of it, D∈V, are the primary and backup destination nodes; and H is the signaling distance restriction for the failover tree. The following algorithms can then be used to mark neighboring OXCs and to find the root OXC for the failover tree. Shortest path first (SPF) algorithms are well-known, and therefore are not described herein.

A MARK procedure marks the neighboring vertices to a vertex K in the network G=(V,E), whose distance to K is less than equal to the signaling distance constraint H. The following is an exemplary MARK algorithm:

Algorithm MARK.
Step 1. [Mark unvisited vertex]
  If $VISITED_K$=false, then
Step 2. Set $VISITED_K$←true; set $MARK_K$←$MARK_K$+1
Step 3. If (K∉D AND $MARK_K$=NDST) then set CANDIDATES←CANDIDATE∪K
Step 4. [Check if another hop is allowed. If it is then visit neighboring vertices]
  If H≠0, then for E=each edges of K do step 5
Step 5. [Check the weight of E against H]
If $WEIGHT_g$<H then CALL MARK (the other vertex of E, H-$WEIGHT_E$)

The MARK algorithm is recursive and calls itself in Step 5 with the statement CALL MARK(K, H), where K is the new vertex being visited, and H is the new signaling distance restriction after a decrement. Upon visiting a previously unvisited vertex, the number of marks for the vertex is increased. The boolean variable $VISITED_K$ indicates whether or not a vertex has been visited. The recursion is terminated if H is equal to zero, and $MARK_K$ stores the number of times a vertex has been marked. While marking, the algorithm also finds a set of vertices that have the same number of marks as the number of destination NDST and puts such vertices in the CANDIDATE set as long as they are not already an element of the destination set D.

A CONSTRUCT TREE procedure constructs a failover tree rooted at one of the vertices in the CANDIDATE set. The following is an exemplary CONSTRUCT TREE algorithm:

---
Algorithm CONSTRUCT_TREE.
---
Step 1. [Initialize] Set T←∅; set P←∅
Step 2. [Construct the tree rooted at a candidate K to all destinations]
  For each K∈CANDIDATE do through step 14
    Step 3. Set G'←G
    Step 4. Set $T_1$←SPF(K, G'); Set DEGREE←0; Set INCLUDE←∅
    Step 5. [Record the paths from K to all destinations]
      For each destination $D_1$∈D do through step 8
        Step 6. [Get the path from K to Di]
    Set $P_1$←{$D_1$, PARENT ($D_1$), PARENT(PARENT($D_1$)), . . . , K}
    Step 7. [Record the vertices on the path if the path from K to $D_1$ exists]
    If $P_1$≠∅ then Set INCLUDE ← INCLUDE∪$P_1$;
      else [Get another candidate] continue step 1.
    Step 8. [Record the degree of the SPF tree from K to $D_1$]
    If DEGREE<LENGTH($P_1$) then set DEGREE←LENGTH($P_1$)
    Step 9. Set G''←G; TREE_ELIMINATE←false; set PATH←∅
    Step 10. [Keep changing the path from S to K when there is an overlap]
    do through step 13 while (INCLUDE∩PATH)≠∅
      Step 11. [Construct SPF path from the source S to K]
      Set $T_2$←SPF(S, G'');

---
Algorithm CONSTRUCT_TREE.
---
Set PATH←{K, PARENT(K), PARENT(PARENT(K)), . . . , S}
Step 12. If PATH=∅ then
  [No path from S to K, change the tree from K to D] go to step 4.
Step 13. If (INCLUDE∩PATH)≠∅ then
  [Remove overlapped vertex for next SPF calculation for S to K. Only remove one at a time]
  set G''(V)←G''(V)∩¬(FIRST_ELEMENT(INCLUDE∩PATH))
  [Eliminate overlapped vertices for next SPF calculation for K to D]
  If TREE_ELIMINATE = false, then
  Set G'(V)←G'(V)∩¬(FIRST_ELEMENT(INCLUDE∩PATH));
  Set TREE_ELIMINATE←true
Step 14 [Track the tree with lowest degree]
If DEGREE<MIN_DEGREE, then
[set the min degree and track the current tree and path]
  set MIN_DEGREE ← DEGREE;
  set T ← $\bigcup_{i=1}^{NDST} P_1$;
  set P←PATH
Step 15. [Check if the tree and the path exist and if it is then concatenate them]
  If T ≠ ∅ AND P ≠ ∅ then set T ← T ∪ PATH Both primary and backup destinations are members of the destination set D. A shortest-path spanning tree calculation is represented by a call to a library algorithm SPF(K, G), where K is the root of the tree and G is the network (V, E). There are actually two SPF calculations. The first SPF calculation is for the shortest-path spanning tree rooted at K ("the tree"). The second one is to calculate the shortest path from S to K ("the path"). If there is an overlap between the tree and the path, the overlapped vertices are eliminated, and the algorithm will reattempt to find the path. If the path still cannot be found, then the tree is recalculated after eliminating vertices that construct the path. The variable FIRST_ELEMENT( )denotes the first element of the set, and X={$x_1$, $x_2$, . . . , $x_n$} denotes a set with $x_1$-$x_n$ as the elements, where x2=PARENT ($x_1$), $x_3$=PARENT($x_2$), etc. Set X is empty if one of the elements has no parent.

An ASF procedure uses the MARK procedure and the CONSTRUCT TREE procedure to find the root OXC and construct the failover tree rooted at the root OXC. The following is an exemplary ASF algorithm:

---
Algorithm ASF.
---
Step 1. Set CANDIDATE<←∅; For I = 1 to NUMBER_VERTEX(G) do $VISITED_1$←false
Step 2. For each Di∈D do step 3 od
Step 3. CALL MARK($D_1$, H)
Step 4. Set MIN_DEGREE←∝
Step 5. CALL CONSTRUCT_TREE The ASF algorithm calls MARK for each destination, and calls CONSTRUCT_TREE to construct the failover tree. The inputs are the source S, the destination set D, and the signaling distance restriction H.

The complexity of algorithm MARK can be analyzed as follows. Step 2 in ASF runs d times, where d is the number of elements in the set D. First, the algorithm examines a maximal number of edges, e from the set of edges, E. With each recursion, the number of edges to examine is one less than the previous one. The recursion depth is h where h is the signaling distance restriction in term of hops, therefore the algorithm complexity is:

$$O(d \times e \times (e-1) \times \ldots \times (e-h+1)) = O((d \times e!)/(e-h)!)$$

Algorithm SPF has a complexity of $O((v+e)\log v)$, where $v$ is the number of vertices in the set of switches, V. Algorithm CONSTRUCT TREE executes the SPF algorithm in step 4. Step 5 is executed d times, giving a complexity of $O(d)$. Step 11 executes another SPF as long as the path is overlapping with the tree, and, since there could be maximum v number of overlap, the complexity is $O(v(v+e)\log v)$. All of steps 4, 5, and 11 are executed c times, where c is the number of elements in the CANDIDATE set. Therefore, the overall complexity of the CONSTRUCT TREE algorithm is:

$$O(c((v+e)\log v + d + v(v+e)\log v)) = O(c(d+(v+1)(v+e)\log v))$$

Figure 31:
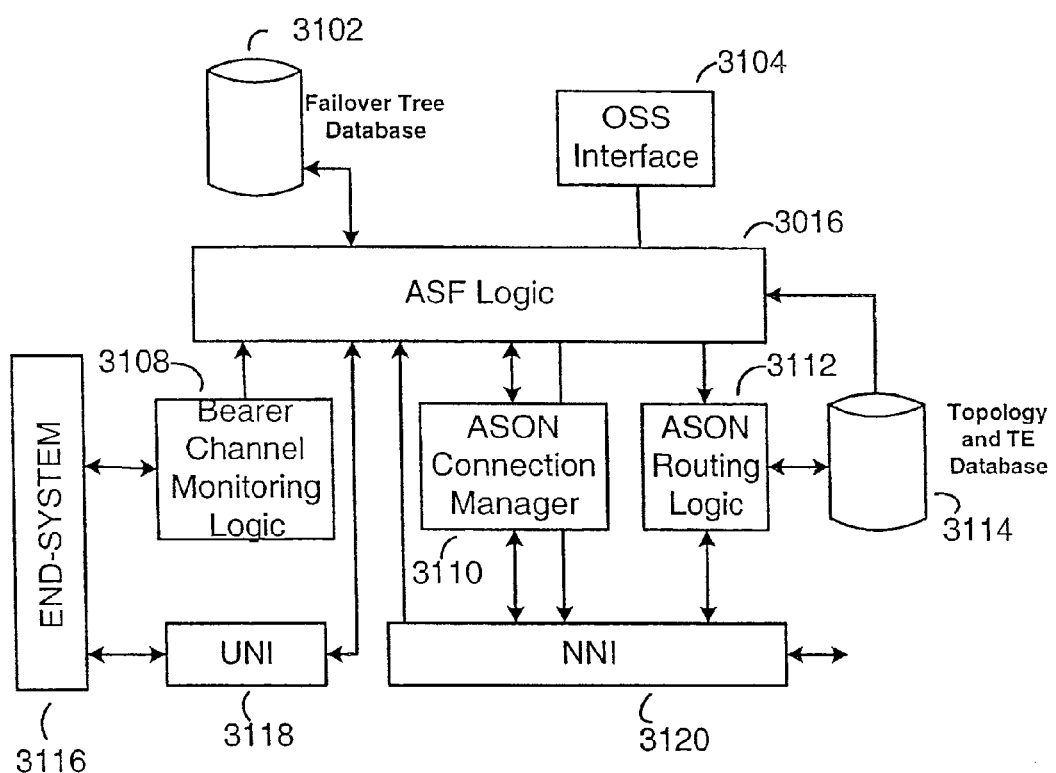
FIG. 31 is a schematic block diagram showing the logical relationship between OSA-N and the various ASON components in accordance with an embodiment of the present invention.

It should be noted that the OSA-N interacts closely with the ASON controller and other ASON components in the ASON edge nodes in order to support ASF functions. The logical relationship between OSA-N and the various ASON components is shown in FIG. 31. The OSA-N includes, among other things, Failover Tree Database 3102, OSS Interface 3104, ASF Logic 3106, and Bearer Channel Monitoring Logic 3108. The ASON edge node also includes ASON Connection Manager 3110, ASON Routing Logic 3112, Topology and Traffic Engineering (TE) Database 3114, ASON UNI 3118, and ASON NNI 3120. The OSA-N records the failover tree structure in the Failover Tree Database 3102. The OSA-N communicates with the OSS via the OSS Interface 3104. The OSA-N monitors the bearer channel to the user end-system 3116 via the Bearer Channel Monitoring Logic 3108. The ASF Logic 3106 performs various ASF functions for the OSA-N, as described below.

As described above, the OSA-N in an ASON edge node can establish a lightpath and a failover tree for the user end-system 3116. When the user end-system 3116 requires a lightpath, the user end-system sends a SETUP request message to the ASON edge node via the ASON UNI specifying the primary end-system one or more backup end-systems, and a maximum failover time. The ASF Logic 3106 intercepts the SETUP request message. The ASF Logic 3106 uses the Topology and TE Database 3114 to determine a root OXC for the failover tree (if a suitable root OXC can be found based upon the specified backup end-systems and maximum failover time). The ASF Logic 3106 constructs the failover tree rooted at the root OXC and records the failover tree structure in the Failover Tree Database 3102. The ASF Logic 3106 sends an NNI lightpath setup request via the ASON Connection Manager 3110 and the NNI 3120 in order to set up the lightpath to the primary end-system and distribute the failover tree to the various nodes in the ASON.

Also as described above, the OSA-N can monitor the user end-system 3116 to detect a degradation or failure affecting the user end-system 3116. Specifically, the ASF Logic 3106 can monitor the bearer channel to the user end-system 3116 via the Bearer Channel Monitoring Logic 3106, and can also "poll" the user end-system 3116 via the ASON UNI 3118 in order to retrieve status information from the user end-system 3116.

Also as described above, the OSA-N can initiate an ASF upon detecting a degradation or failure affecting the user end-system 3116. Specifically, upon detecting a degradation or failure affecting the user end-system 3116, the ASF Logic 3106 sends a leave message to the OSS via the OSS Interface 3104. The ASF Logic 3106 also retrieves the failover tree structure from the Failover Tree Database 3102, and causes a release message to be sent to the parent node via the ASON Connection Manager and the ASON NNI 3120.

Also as described above, the OSA-N can establish the backup lightpath. Specifically, when the ASF Logic 3106 receives a release message from a downstream node, the ASF Logic 3106 relinquishes lightpath resources for the existing lightpath. The ASF Logic 3106 also retrieves the failover tree structure from the Failover Tree Database 3102 and determines whether it is the failover node for the failover tree. If the node is not the failover node for the failover tree, then the ASF Logic 3106 forwards the release message to its upstream neighboring node. If, however, the node is the failover node for the failover tree, then the ASP Logic 3106 causes an NNI lightpath setup request message to be sent toward the backup edge node via the ASON Connection Manager and the ASON NNI 3120. The ASF Logic 3106 reserves lightpath Resources for the backup lightpath accordingly.

In the backup edge node, the ASF Logic 3106 sends a connect message upstream toward the failover OXC in order to confirm the backup lightpath.

Upon receiving a connect message from the backup edge node, the ASF Logic 3106 in the failover OXC makes any necessary switching changes to switch traffic to the backup lightpath.

It should be noted that the mechanism for determining the root of the failover tree can be used to determine the core node of shared-based tree multicast rooting protocols. For Protocol Independent Multicast Sparse Mode (PIM-SM), the root is the Rendevouz Point (RP). For Core Based Trees (CBT), the root is the core.

Load balancing can be used to reduce or eliminate disruptions caused by ASF switching. Specifically, two lightpaths are established from the protected end-system to the primary end-system, and traffic is balanced over the two lightpaths such that approximate half of the traffic flows over one lightpath and the other half of the traffic flows over the other lightpath. Such redundant lightpaths are necessary or desirable for certain applications, such as network storage applications. When a degradation or failure affecting one of the redundant lightpaths is detected, all traffic is switched to the unaffected lightpath while ASF is performed to switch the affected lightpath to a backup lightpath. Once the backup lightpath is available, traffic can be balanced between the unaffected lightpath and the backup lightpath.

Figure 32:
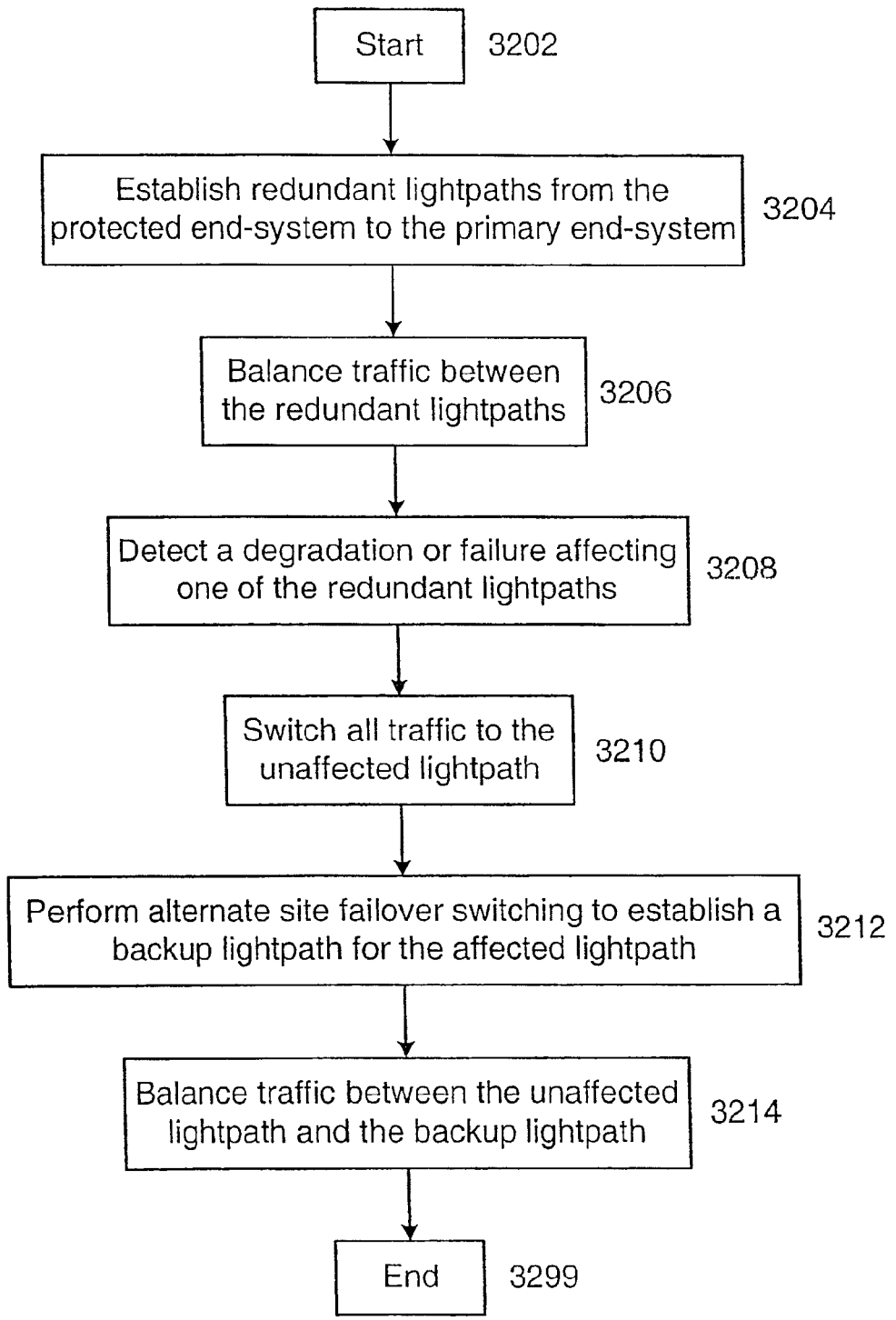
FIG. 32 is a logic flow diagram showing exemplary logic for performing alternate site failover switching using load balancing in accordance with an embodiment of the present invention.

FIG. 32 is a logic flow diagram showing exemplary logic 3200 for performing ASP switching using load balancing. Beginning at block 3202, redundant lightpaths are established from the protected end-system to the primary end-system, in block 3204. Traffic is balanced between the redundant lightpaths, in block 3206. Upon detecting a degradation or failure affecting one of the redundant lightpaths, in block 3208, all traffic is switched to the to the unaffected lightpath, in block 3210. One all traffic is switched to the unaffected lightpath, ASF switching is performed to establish a backup lightpath for the affected lightpath, in block 3212. Once the backup lightpath is available, traffic is balanced between the unaffected lightpath and the backup lightpath, in block 3214. The logic 3200 terminals to block 3299.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall result or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instruction that is converted into a computer executable form, stored as such in a computer readable medium, and executed by a microprocessor within a network node under the control of an operating system.

Computer program logic implementing all or part of the functionality previously described hereto may be embodied in various forms, including, but in no way limited to, a source code form, a computer executable form, and various intermediate forms (e.g., forms generated by an assembler, compiler, linker, or locator). Source code may include a series computer program instructions implemented in any of various programming languages (e.g., an object code, an assembly language, or a high-level language such as Fortran, C, C++, JAVA, or HTML) for use with various operating systems or operating environment. The source code may define and use various data structures and communication messages. The source code may be in computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulleting board over the communication system (e.g., the Internet or World Wide Web).

Hardware logic (including programmable logic for use with a programmable logic device) implementing all or part of the functionality previously described herein may be designed using traditional manual methods or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily to a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog, technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

The invention claimed is:

1. A method of operating an optical network, comprising:
    establishing a primary optical path in the optical network between a first edge node of the optical network and a second edge node of the optical network for communication between the first edge node and a primary customer network site coupled to the second edge node;
    determining a backup optical path through the optical network from the first edge node to a third edge node of the optical network other than the second edge node for communication between the first edge node and a backup customer network site coupled to the third edge node of the optical network, the backup customer network site being designated to back up the primary customer network site, comprising determining a tree of backup optical paths through the optical network from the first edge node to respective other edge nodes of the optical network other than the first edge node and the second edge node, each respective other edge node being coupled to a respective backup customer network site designated to back up the primary customer network site, and determining a root node for the tree of backup optical paths by:
        identifying a candidate node that is within a predetermined distance from the at least one backup customer network site;
        constructing a shortest-path spanning tree from the candidate node to the at least one backup customer network site; and selecting the candidate node as the root node if and only if the tree of backup optical paths does not include any link from the protected customer network site to the candidate node;

forwarding communications on the primary optical path from the first edge node toward the primary customer network site via the second edge node, comprising forwarding communications on a selected one of the backup communications paths toward a selected one of the backup customer network sites; and upon detection of a degradation or failure of the primary customer network site, forwarding communications on the backup optical path from the first edge node toward the backup customer network site via the third edge node.

2. The method of claim 1, wherein a protected customer network site is coupled to the first edge node of the optical network for communication with the primary customer network site via the optical network.

3. The method of claim 2, comprising designating at least one backup customer network site to back up the primary customer network site.

4. The method of claim 3, wherein designating at least one backup customer network site comprises receiving a setup request from the protected customer network site specifying the at least one backup customer network site.

5. The method of claim 3, wherein designating at least one backup customer network site to back up the primary customer network site comprises automatically discovering the at least one backup customer network site using a predetermined auto-discovery mechanism.

6. The method of claim 1, wherein identifying a candidate node that is within a predetermined distance from the at least one backup customer network site comprises using a marking scheme to identify the candidate node.

7. The method of claim 1, wherein identifying a candidate node that is within a predetermined distance from the at least one backup customer network site comprises solving a geometrical problem to identify the candidate node.

8. The method of claim 1, wherein determining a tree of backup optical paths comprises constructing a shortest-path spanning tree from the candidate node to the at least one backup customer network site.

9. The method of claim 1, wherein constructing a shortest-path spanning tree from the candidate node to the at least one backup customer network site comprises constructing the shortest-path spanning tree based on topology information obtained from a routing protocol.

10. The method of claim 1, comprising detecting a degradation or failure affecting the primary customer network site by at least one of:

monitoring a bearer channel between the primary customer network site and a corresponding edge node in the optical communication network; and querying the primary customer network site by an optical service agent in the corresponding edge node.

11. The method of claim 1, wherein forwarding communications on the backup optical path from the first edge node toward the backup customer network site via the third edge node comprises:

determining a failover node along the tree of backup optical paths;

establishing a backup lightpath from the failover node to a backup customer network site; and switching traffic to the backup lightpath by the failover node.

12. The method of claim 11, wherein determining a failover node along the tree of backup optical paths comprises:

propagating a release message upstream from the second edge node coupled to the primary customer network site toward a predetermined root node of the tree of backup optical paths;

receiving the release message by an intermediate node between the second edge node and the predetermined root node; and determining by the intermediate node that the intermediate node supports a backup customer network site.

13. The method of claim 11, wherein establishing a backup lightpath from the failover node to a backup customer network site comprises:

sending a lightpath setup request message by the failover node downstream toward the backup customer network site; and reserving appropriate lightpath resources by a number of nodes between the failover node and the backup customer network site.

14. The method of claim 11, wherein switching traffic to the backup lightpath by the failover node comprises:

sending a connect message from the third edge node coupled to the backup customer network site to the failover node; and switching traffic to the backup lightpath by the failover node upon receiving the connect message.

15. The method of claim 11, further comprising relinquishing lightpath resources by a number of nodes from the failover node to the primary customer network site.

16. The method of claim 1, further comprising:

determining that the primary customer network site has become available; and switching traffic back to the primary customer network site.

17. The method of claim 1, further comprising:

determining that the primary customer network site has become available; and designating the primary customer network site to back up the backup customer network site.

* * * * *